US007107168B2

(12) United States Patent
Oystol et al.

(10) Patent No.: US 7,107,168 B2
(45) Date of Patent: Sep. 12, 2006

(54) SYSTEM FOR MEASURING THE EFFECT OF BEARING ERRORS IN AN ACTIVE DEVICE

(75) Inventors: Lars E. Oystol, Buellton, CA (US); Fiona M. Gaston, Santa Barbara, CA (US); Brad E. Paden, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 509 days.

(21) Appl. No.: 10/626,851

(22) Filed: Jul. 22, 2003

(65) Prior Publication Data

US 2004/0143413 A1 Jul. 22, 2004

Related U.S. Application Data

(60) Provisional application No. 60/397,400, filed on Jul. 22, 2002.

(51) Int. Cl.
*G06F 19/00* (2006.01)

(52) U.S. Cl. ............................................. 702/94; 702/85

(58) Field of Classification Search ................. 73/1.01, 73/1.75, 1.77, 1.78, 1.79, 432.1, 865.9, 866.5; 701/1, 200, 207, 214, 221; 702/85, 94, 95, 702/127, 150, 151, 152, 153; 714/699, 703
See application file for complete search history.

(56) References Cited

U.S. PATENT DOCUMENTS 3,681,583 A * 8/1972 Kubo et al. ................ 701/30
3,830,447 A * 8/1974 Phillips ....................... 244/170
4,894,788 A * 1/1990 Stelzer ........................ 700/262
4,911,385 A * 3/1990 Agrawal et al. ............ 244/165

FOREIGN PATENT DOCUMENTS

JP   2002-175120   *  6/2002
JP   2002-244740   *  8/2002

OTHER PUBLICATIONS

Penn State Machine Dynamics Research Lab, Graduate Student Theses, Jul. 1, 2003, http://www.me.psu.edu/mdrl/pubs.htm.
"Use and Calibration Of Ultraprecision Axes Of Rotation With Nanometer Level Metrology", Grejda, Robert D., Pennsylvania State University, College of Engineering, Dec. 2002, pp. 1–135.

* cited by examiner

*Primary Examiner*—Michael Nghiem
*Assistant Examiner*—Douglas N Washburn
(74) *Attorney, Agent, or Firm*—William C. Schubert; Karl A. Vick

(57) ABSTRACT

Disclosed herein are apparatus and methods for measuring error associated with the rotation of bearings (50) used within a pointing device (11) on board a space-based platform. The apparatus includes inductive, or "eddy current," proximity sensors (1000) adapted for measuring the positioning of bearing components. The apparatus also includes processing capabilities (1010) for receiving data from the proximity sensors (1000), and producing compensation data. The compensation data is used in one of various techniques for correcting errors in the angular measurement or pointing of the device (11). The techniques disclosed herein include conducting an initial calibration of the proximity sensors (1000) and generating calibration data. Once in active use, sensor measurements are combined with calibration data to produce compensation data. Ongoing measurements may be used to update the calibration data as necessary.

25 Claims, 28 Drawing Sheets

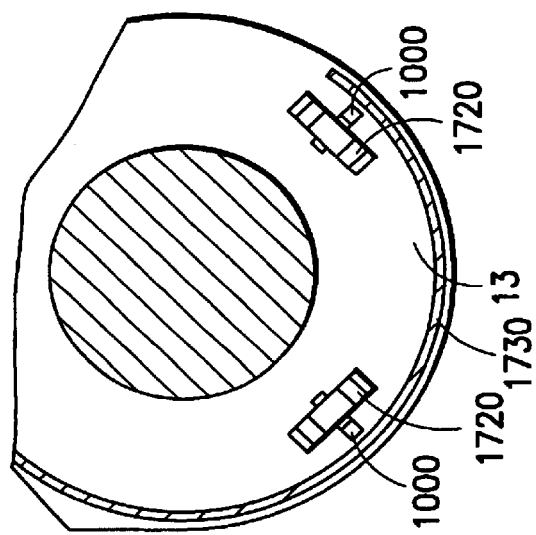
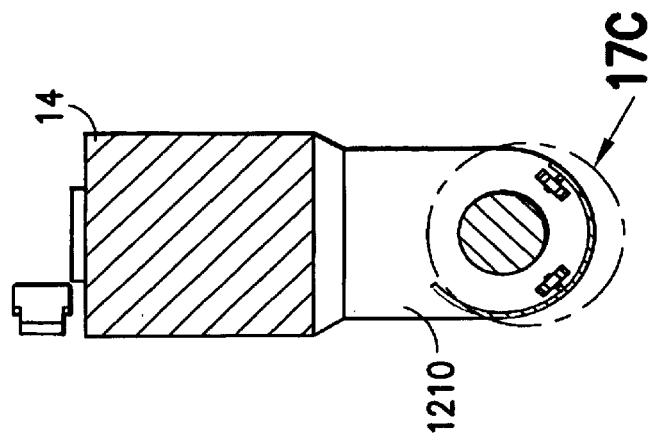
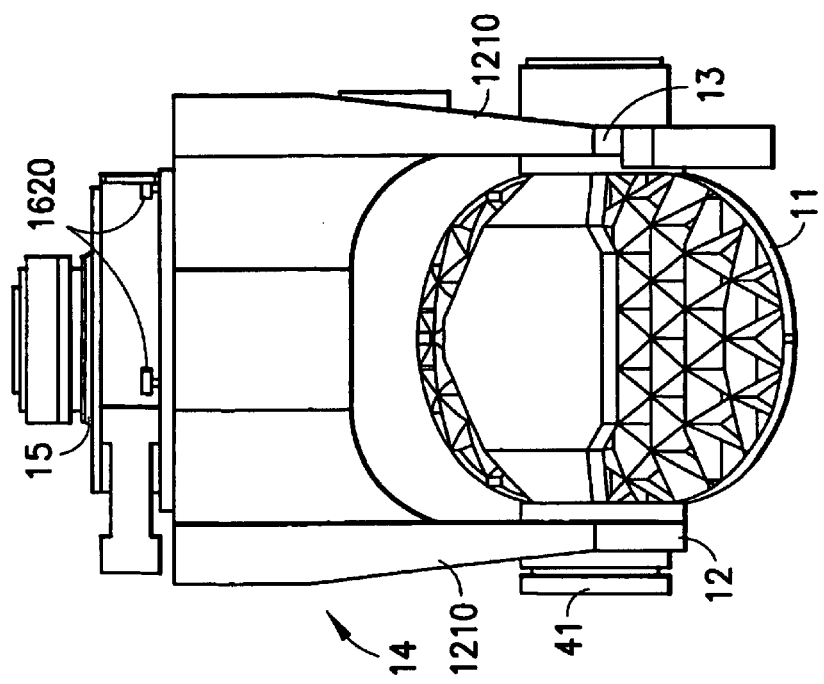

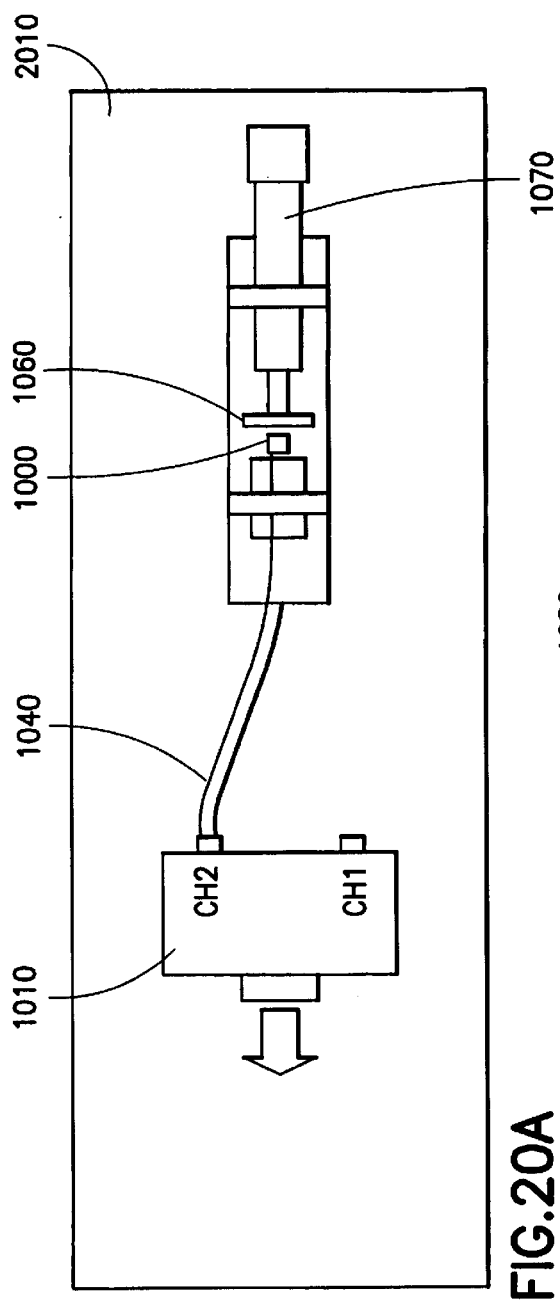
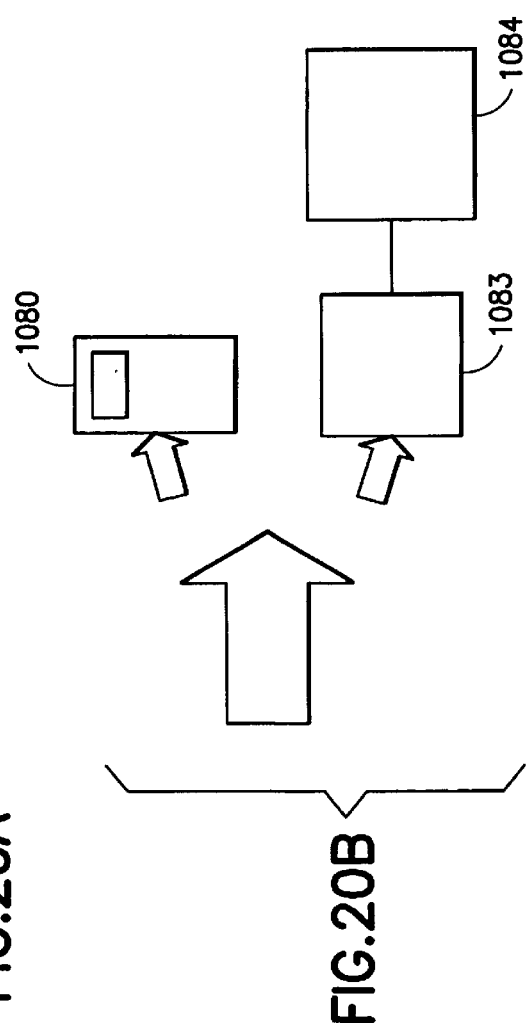
FIG.20A
FIG.20B

SYSTEM FOR MEASURING THE EFFECT OF BEARING ERRORS IN AN ACTIVE DEVICE

CROSS REFERENCE TO RELATED APPLICATIONS

This application claims priority under 35 U.S.C. §119(e) to U.S. Provisional Patent Application Ser. No. 60/397,400, filed Jul. 22, 2002.

TECHNICAL FIELD OF THE INVENTION

This invention relates to detection, measurement, and correction of error in angular measurement devices for space-borne imaging systems.

BACKGROUND OF THE INVENTION

Today, satellite systems provide us with a great deal of valuable information. For example, earth orbiting satellites have proven to be a great asset in the gathering of intelligence information, weather information, and in the implementation of ground based positioning systems. In particular, satellites have proven to be effective in the imaging of surface features on the earth.

In typical imaging applications, a satellite is implemented as an orbiting telescope. Typically included in the telescope is some sort of pointing device, such as a mirror. The pointing device is typically assembled with various moving components (such as bearings) to provide for the movement thereof. Typically, the mirror scans the surface of the earth in a set pattern, and a telescope which receives images from the mirror, provides data to imaging apparatus to assemble a composite image.

However, as there is a demand for better quality images, such as closer views of surface features, the performance of the pointing device must be improved. One source of error in such a pointing device includes the error in the actual pointing. Such error is typically a result of limitations in the moving components.

In many high-precision devices, operation of rotating components is frequently limited by bearing error, or "wobble." Examples of rotating components include an optical imaging device on a satellite or a hard disk drive (HDD) within a data storage unit. Typically, performance requirements for rotating components are limited by the bearing manufacturing techniques. For example, improved performance typically requires that the bearings include surfaces that are as smooth as possible, which, at a minimum typically means costly manufacturing techniques. However, even with improved manufacturing, there is no way to eliminate bearing related variability altogether.

In radial bearings, variability may occur in the shapes or dimensions of the surfaces, and inconsistencies in the materials. Examples of radial bearings include ball bearings, roller bearings, tapered roller bearings, magnetic bearings, air-filled bearings and others. In roller bearings, variability may be seen in the surfaces such as the rolling bodies (such as the balls, rollers, tapered rollers, etc, . . . ), as well as in the raceways of the inner and outer rings. In non-roller bearings, variability may materialize in the magnetic field strength or fluid distribution. The variability inherent in these bearings causes error, which is often referred to as "run-out," or "point run-out." Run-out has two components, one being repeatable and the other non-repeatable.

In roller bearings it is generally assumed that the "repeatable point run-out" (RPR) is caused by inconsistencies of the raceway. That is because typically, for any particular orientation of an inner ring in relation to an outer ring, the inconsistencies will generally line up and remain static. The Non-Repeatable Point Run-Out (NRPR) is usually attributed to the rolling elements as the rolling elements generally align themselves differently even when the inner and outer rings are orientated in a particular way. Regardless of the cause, the errors observed in any bearing will have a predictable component and an apparently random component. These are referred to herein as RPR and NRPR respectively.

One way to overcome manufacturing limitations in a bearing is to measure the effect of the variability and then compensate for the effect. Various systems have been used to measure the error of revolving shafts, and in some cases, such as in the machine tool industry, even incorporate eddy current proximity sensors. One known method for compensation from limitations is the use of a control system to adjust positioning of components of the device based upon the measured error. Another known method is to correct error in software. One useful source of information on this topic is the Internet site for the Machine Dynamic Research Laboratory at Penn State University.

The effect of repeatable point run-out (RPR) may be reduced, at least initially, as RPR can be measured and compensated for prior to service of the bearing. However, over time, RPR changes due to wear of the bearing. The wear leads to degradation in performance, unless the RPR can be measured and compensated for during service. Therefore, measuring or understanding the effect of the point run-out, whether repeatable or non-repeatable, can be more important than having a bearing produced at the limits of manufacturing precision.

Research has been conducted to assess RPR. However, this research has not evaluated the effect of RPR in compound systems (i.e. systems including bearings operating along various axes). More specifically, current techniques provide for evaluation of run-out in a bearing. These systems do not account for angular error in a device mounted to bearings rotating along an azimuth axis and an elevation axis.

Examples of research into bearing error include graduate student theses published by Penn State University, and available at the Internet website of the Machine Dynamics Research Laboratory thereof. One example is entitled "Use and Calibration of Ultra-Precision Axes of Rotation with Nanometer Level Metrology," by Bob Grejda. This thesis presents a spindle calibration device designed to quantify nanometer level error motions of ultraprecision axes of rotation. The device has the ability to determine error motions in various directions for a spindle under test.

Existing research, as is presently known, falls short of determining angular error that arises in a pointing device from aggregation of the RPR errors, where the pointing device is mounted in an assembly that includes bearings operating on separate axes. Further, a system has not been devised to provide for accurate measurement of the position of a pointing device used on board a spacecraft, (also referred to as a space-based platform).

What is needed is a system that can be incorporated into a device having a rotating component, in order to measure the non-repeatable point run-out (NRPR) as it occurs, and changes in repeatable point run-out (RPR). The system should provide for high quality data over the service life of the component. The system should be amenable to being deployed in a spacecraft, and should therefore be capable of having a service life measured in years.

SUMMARY OF THE INVENTION

The foregoing and other problems are overcome by methods and apparatus in accordance with embodiments of this invention. Disclosed herein are methods for compensating for the point run-out error occurring in an active device.

Although disclosed in terms of a system for angular measurement of a pointing device in a space-borne imaging system (satellite), it should be understood the teachings herein may be used in other embodiments or devices where rotating components exist, and where high-precision operation is preferred. One skilled in the art will recognize the usefulness of these teachings herein for such applications. Accordingly, other applications are within the scope of these teachings, and the invention herein is not limited by this disclosure.

Disclosed herein are apparatus and methods for measuring error associated with the rotation of bearings used within a pointing device on board a space-based platform. The apparatus includes at least one inductive, or "eddy current," proximity sensor adapted for measuring the positioning of bearing components. The apparatus also includes processing capabilities for receiving data from the at least one proximity sensor, and producing compensation data. The compensation data is used in one of various techniques for correcting errors in the angular measurement or pointing of the device. The techniques disclosed herein include conducting an initial calibration of the at least one proximity sensor and generating calibration data. Once in active use, sensor measurements are combined with calibration data to produce compensation data. Ongoing measurements may be used to update the calibration data as necessary.

One aspect of the teachings herein includes a method for determining a pointing error of an object attached to a shaft, which includes: providing a set of distance measuring probes at each end of the shaft; using the probes, measuring a position of each end of the shaft for producing shaft-end position data; determining a geometric error vector for each end of the shaft from the shaft-end position data; and, using the geometric error vector, determining the pointing error of the object.

Another aspect of the teachings herein includes an apparatus for determining a pointing error of an object attached to a shaft, which includes: a set of distance measuring probes disposed at each end of the shaft adapted for monitoring a position of the shaft and producing shaft-end position data, the set of distance measuring probes being coupled to a processor for receiving the shaft-end position data and determining a geometric error vector for each end of the shaft and using the geometric error vector, determining the pointing error of the object.

Another aspect of the teachings herein includes a method to characterize the repeatable positioning error in a pointing device in a space-based platform, the method including: providing a set of distance measuring probes at each end of the shaft; setting the shaft to a predetermined location; measuring a position of each end of the shaft at the predetermined location for producing position data; determining a geometric error vector from the position data for each end of the shaft; using the geometric error vector, determining a pointing error of the pointing device; storing the pointing error for each predetermined location to establish a pointing error record; repeating the determining of the pointing error until a new determination of pointing error for a predetermined location is within an acceptable tolerance for agreement with the pointing error record; and, identifying the pointing error stored in the pointing error record as repeatable position error data.

Another aspect of the teachings herein includes a computer program product stored on a computer readable storage medium, comprising computer readable program code instructions to determine a pointing error of an object, the instructions including steps for: producing measurement data for a location of the object by measuring a position of a shaft with a set of distance measuring sensors disposed at each end of the shaft to which the object is attached; determining a geometric error vector for each end of the shaft from the position data; and, using the geometric error vector, determining the pointing error of the object.

Another aspect of the teachings herein includes a method for determining pointing error of a pointing device, which includes: providing the pointing device attached to a shaft, the shaft coupled to a first bearing assembly rotating about a first axis, and coupled to a second bearing assembly rotating about a second axis, and a set of distance measuring sensors adapted to monitor the position of the pointing device; measuring the position of the pointing device along the first axis and the second axis to produce position data, ds; retrieving repeatable error data from a source of calibration data to produce a repeatable error component; subtracting the repeatable error component from the position data, ds, to produce a non-repeatable error component, ads; using the non-repeatable error component, ads, computing a first axis position error, $\Delta_{az}$, and computing a second axis position error, $\Delta_{el}$; and, computing the pointing device error, MOA_ERROR, as $$\text{MOA\_ERROR} = \begin{bmatrix} \Delta_{azy} \cdot \cos(el + \pi/4) - \Delta_{el} \cdot \sin az \\ -\Delta_{azx} \cdot \cos(el + \pi/4) + \Delta_{el} \cdot \cos az \\ \sin(el + \pi/4)(-\Delta_{azy} \cdot \cos az + \Delta_{azx} \cdot \sin az) \end{bmatrix};$$

where $\Delta_{azy}$ denotes a y-axis component of the first axis position error, $\Delta_{az}$; $\Delta_{azx}$ denotes a x-axis component of the first axis position error, $\Delta_{az}$; el denotes an angle in the second axis, and az denotes an angle in the first axis.

One additional aspect of the teachings herein includes a method for compensating for pointing error in a pointing device attached to a shaft of a spacecraft, comprising: providing a set of distance measuring probes at each end of the shaft; measuring a position of each end of the shaft for producing position data; determining a geometric error vector for each end of the shaft from the position data; using the geometric error vector, determining the pointing error of the pointing device; using the pointing error to adjust one of a position of the pointing device and a set of data produced by the pointing device.

BRIEF DESCRIPTION OF THE DRAWINGS

The above set forth and other features of the invention are made more apparent in the ensuing Detailed Description of the Invention when read in conjunction with the attached Drawings, wherein:

FIGS. 17A–C, collectively referred to as FIG. 17, show a further embodiment of proximity sensors mounted on a gimbal;

FIGS. 20A and 20B, collectively referred to as FIG. 20, depicts a test apparatus for assessing the performance of proximity sensors with various target materials;

DETAILED DESCRIPTION OF THE INVENTION

Disclosed herein are methods and apparatus for compensating for the effect of error in a high precision bearing. A high precision bearing, as disclosed herein, is used as a part of a larger device, such as a spaced-based platform, for example a satellite imaging application. For convenience, an outline of the disclosure herein is provided, as well as some introductory definitions.

The disclosure herein provides an introduction, and a description of: I exemplary bearing errors and aspects of space-based applications; II. an algorithm for estimating error; III. measurement tools and methods of measuring error; and, IV. software and modeling.

As used herein, "point run-out" or "run-out" (PR) generally refers to the scalar distance deviation from ideal at a particular relative position of an inner ring and an outer ring of a bearing. Run-out is usually a measure of the worst case of deviation from the ideal, not the error at a particular point or orientation. "Maximum" point run-out is equal to the bearing run-out. "Repeatable point run-out" (RPR) is a systematic appearance of point run-out, while "non repeatable point run-out" (NRPR) is essentially random point run-out. Each of the foregoing is a source of error in the precision of the bearing or the component mounted thereto.

Figure 1:
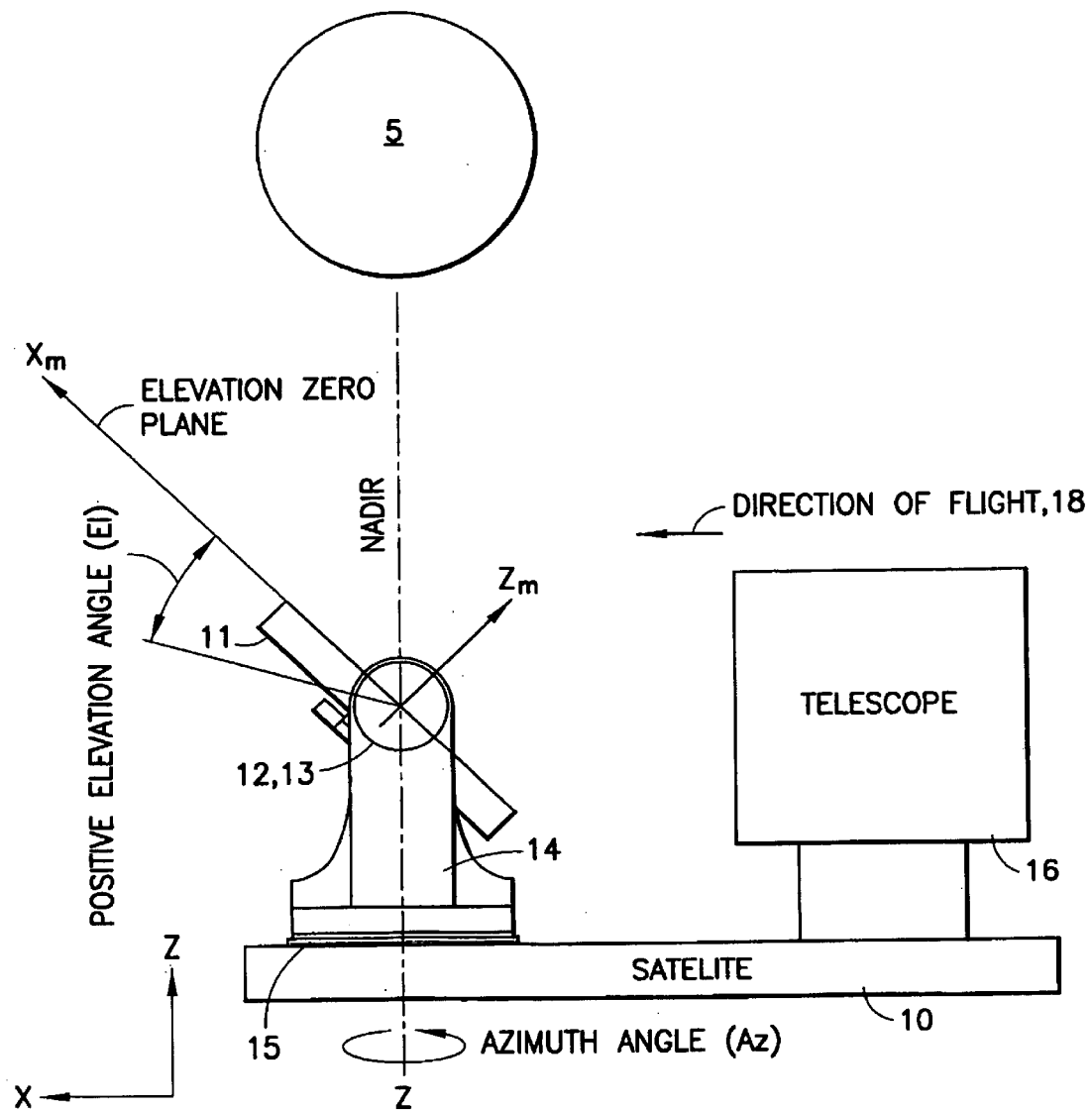
FIG. 1 depicts imaging components of a satellite system.

Referring to FIG. 1, there are shown components of a satellite system 10 that is oriented for observation of a target 5. The satellite 10 includes a rotating mirror 11, which is mounted to a gimbal 14 by elevation bearings 12, 13 disposed on either side of the mirror 11. The mirror 11 reflects images to a telescope 16. The gimbal 14 is mounted to the satellite 10 on an azimuth bearing 15, which rotates about a Z-axis. The satellite system 10 travels along a direction of flight 18, such as when orbiting the satellite target 5.

Figure 2:
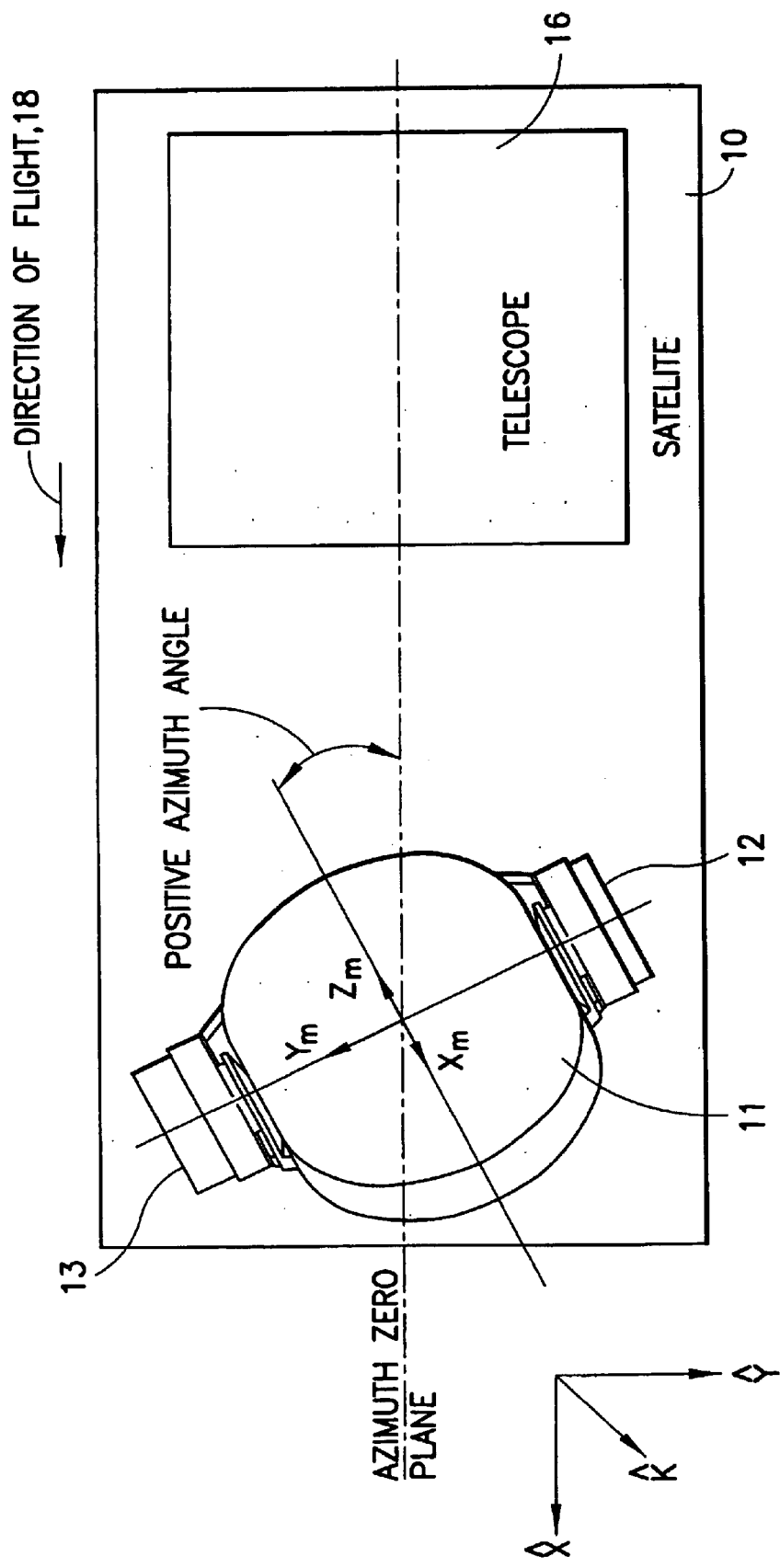
FIG. 2 is a further view of the imaging components of the satellite system.

FIG. 2 provides a perspective view of the mirror 11 and the elevation bearings 12, 13. The elevation bearings 12, 13 are shown in FIG. 2 as an elevation encoder bearing 12, and an elevation motor bearing 13. For the sake of convenience, the elevation encoder bearing 12, and the elevation motor bearing 13 will generally be referred to herein as the "elevation bearings 12, 13."

It should be recognized that although the teachings herein disclose use of certain bearing assemblies 12, 13, 15, that fewer or more bearings may be used. Further, it should also be recognized that certain axes (azimuth and elevation) are disclosed. However, other axes and nomenclature may be used. Therefore, neither the embodiments of bearings or axes as disclosed herein should be considered limiting of the invention.

Figure 3:
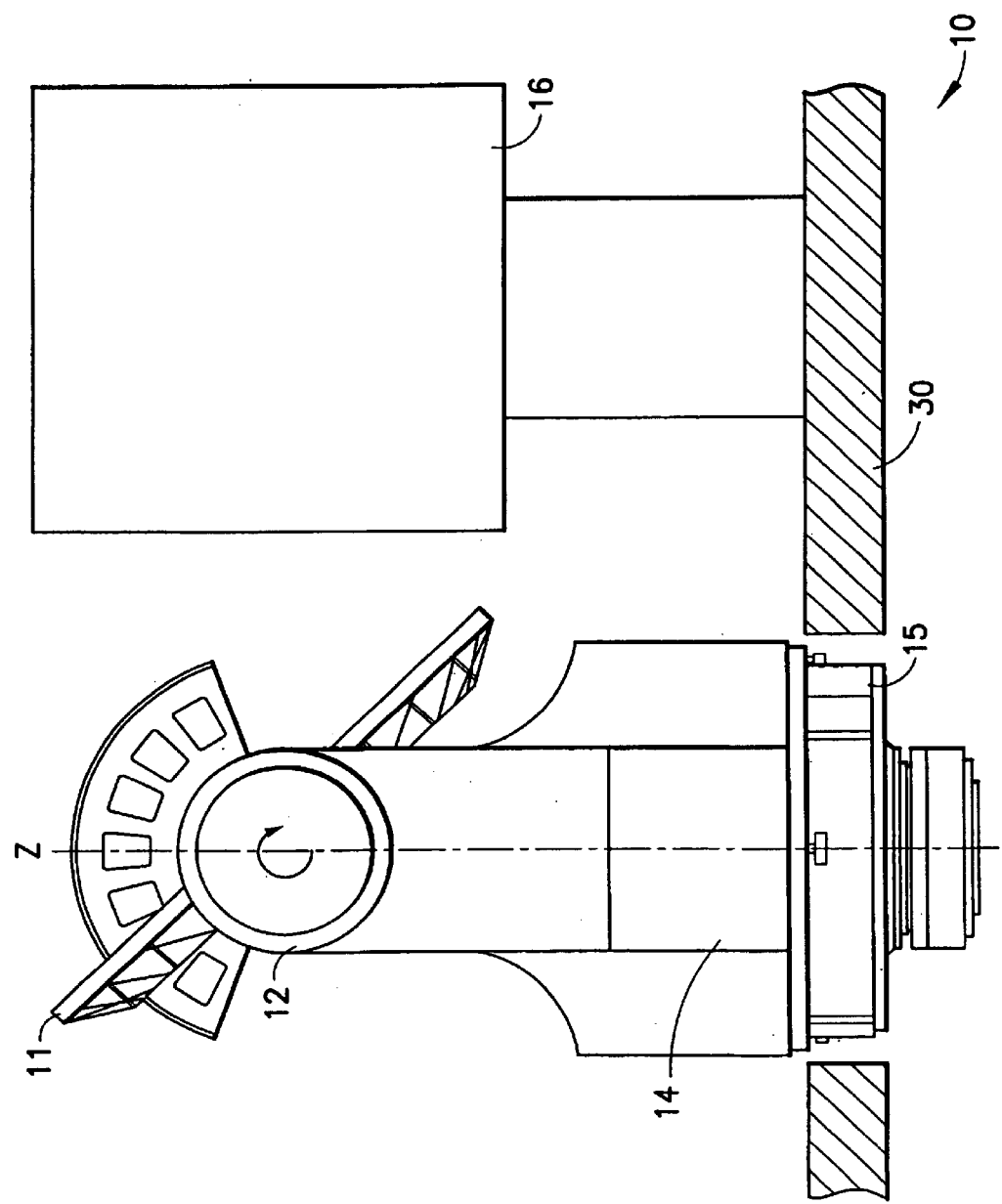
FIG. 3 is another view of the imaging components of the satellite system.
Figure 4:
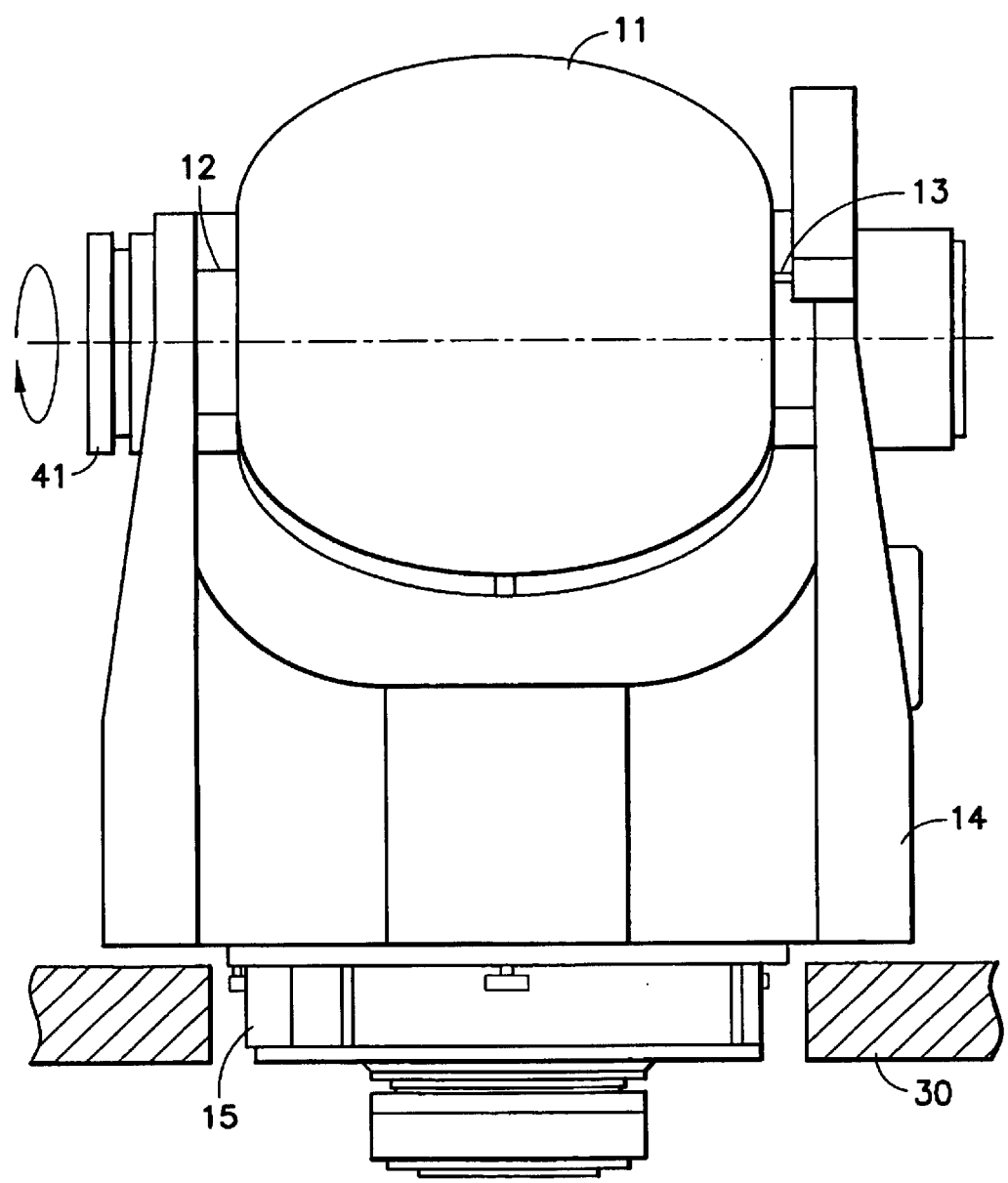
FIG. 4 depicts mounting of exemplary bearings supporting the imaging components.

FIG. 3 provides a cutaway view of aspects of the satellite system 10. In FIG. 3, the azimuth bearing 15 is shown. Preferably, the azimuth bearing 15 is securely affixed to a base 30 included in the satellite 10, and rotates about the z-axis. FIG. 4 provides another perspective of the mirror 11 mounted on the gimbal 14, which rotates on the azimuth bearing 15. FIG. 4 shows that the elevation encoder bearing 12 and the elevation motor bearing 13 are mounted upon an elevation axis axle 41.

As used herein, the term "pointing device" generally refers to a mirror. However, this reference is not limiting of the embodiments of a pointing device. The terms "pointing device" and "mirror" are considered interchangeable. These terms, and other similar terms as may be used herein or known in the art, generally refer to a device that incorporates bearings as components for supporting the movement thereof. Examples of other pointing devices may include, without limitation, lasers, laser transceivers, and angular measurement indicators (not shown). One example of an angular measurement indicator is an Inductosyn®, of Farrand Controls Corporation of Valhalla, N.Y.

As an introduction, the teachings herein provide for the refinement of measurements of the location of a pointing device. That is, a pointing device is located by a device such as an angular measurement device. Error will inevitably arise in the locating of the pointing device. The teachings herein provide for augmentation of the angular measurement device, through the refinement of pointing information, and associated error.

I. Exemplary Bearing Errors

Figure 5:
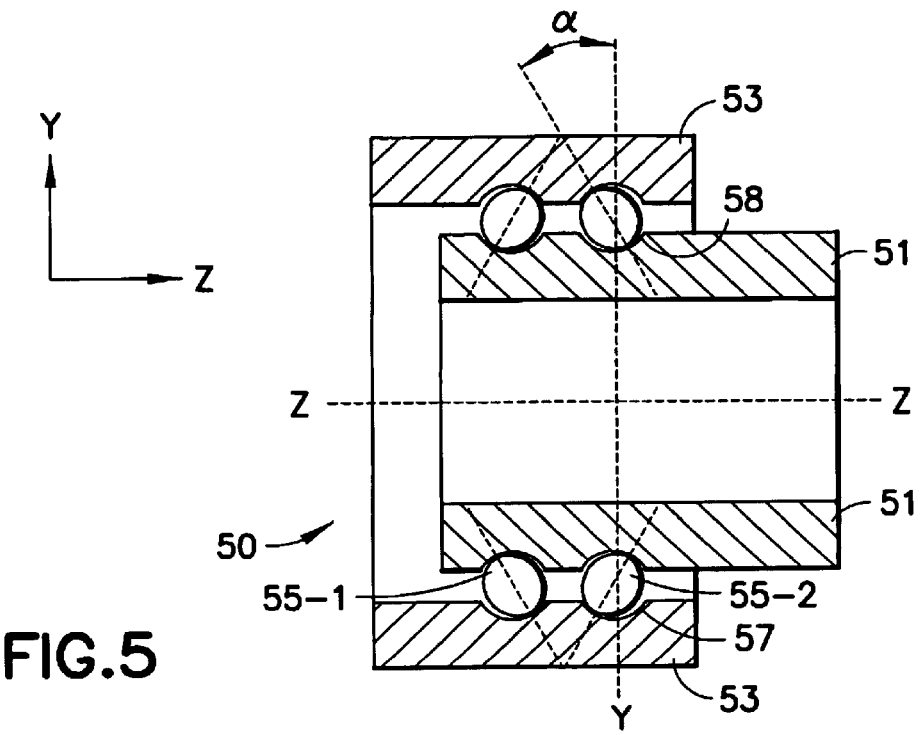
FIG. 5 is a cross sectional view of components of a bearing assembly.

Referring to FIG. 5, there are shown components of an exemplary bearing assembly 50 in a cross sectional view. The bearing assembly 50 includes an inner ring 51, an outer ring 53, and rolling elements 55-1, 55-2 (also referred to as "rolling elements 55"). The inner ring 51 includes at least one raceway 58, the outer ring 53 includes at least one raceway 57. The raceways 57, 58 typically include a groove or other similar type of feature for containing the rolling elements 55. The bearing principally rotates about the Z-axis. Ideally, the axes of the inner ring 51 and the outer ring 53 will be coincident, as is shown in FIG. 5.

In practice, the outer ring 53 will be fixed, and the inner ring 51 will move relative to the outer ring 53, through the intermediary action of the rolling elements 55.

Figure 6:
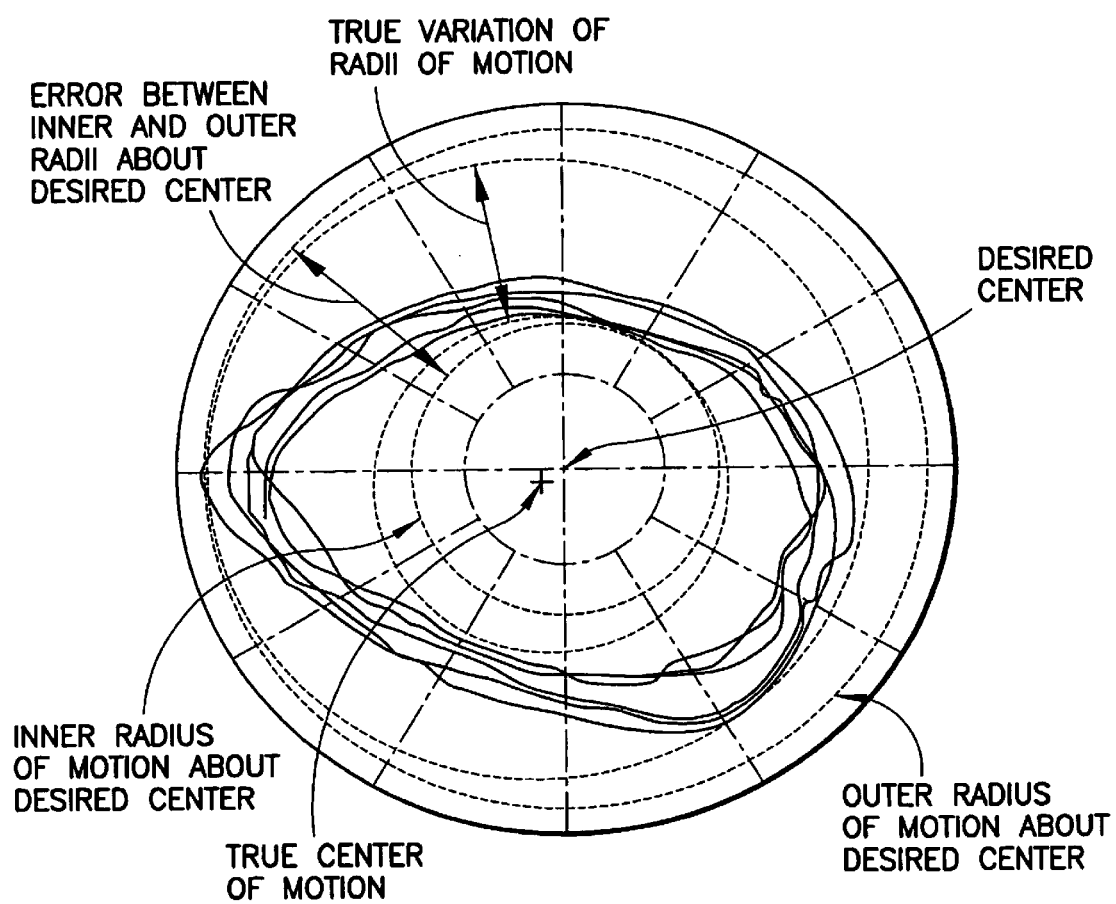
FIG. 6 is a graphic depicting an exemplary repeatable error component with a superimposed non-repeatable error component for a bearing assembly.

Repeatable versus Non-repeatable Bearing Errors. FIG. 6 shows qualitatively how a rotational bearing assembly 50 typically wobbles about the z-axis of rotation. FIG. 6 provides an illustration of a significant repeatable component with a superimposed non-repeatable component. The actual values of these variations depend upon various factors, including the quality and size of the bearing assembly 50. The diagram also shows that the desired center of rotation and the true, or actual, center of rotation can be different. The size of the variability in the rotation is dependent upon the center of rotation to which one refers.

Repeatable errors are largely attributed to imperfections associated with the bearing rings 51, 53. Each ring 51, 53 is typically ground to some radial run-out accuracy, for example, $300 \times 10^{-6}$ inches. Each of the rings 51, 53 therefore have some residual high and low points thereon. Once in service, a generally consistent geometry is established between the inner ring 51 and the outer ring 53. Therefore, for each rotation, every time a given location on one ring 51 lines up with a corresponding location on the other ring 53, an associated angular error is generally repeated. It is recognized that the angular errors typically change with wear.

The foregoing assumes that the rolling elements 55 are touching the races 57, 58 at the same points for any given orientation of the rings 51, 53. This may not be entirely accurate, as there could be slippage of one or both of the rings 51, 53 and the rolling elements 55. For at least this reason, while some error may be considered "repeatable," the error may only be generally repeatable. Accordingly, error that is considered repeatable point run-out (RPR), should not be construed as being entirely repeatable or predictable. Defining an error as being "repeatable" typically requires having some qualifying criteria, such as an average and an acceptable deviation therefrom.

Non-repeatable Bearing Errors. Non-repeatable run-out (NRPR) is largely attributed to errors arising from orientation and operation of the rolling elements 55. Aspects of the rolling elements 55 that may affect error include aspects, such as, where each element 55 is relative to the rings 51, 53; the orientation of each rolling element 55; whether the elements 55 are properly aligned; and, others.

Although there are many manufacturing processes for production of rolling elements 55 (i.e. the bearing balls 55), the rolling elements 55 always include some degree of imperfection. For example, a Grade 10 bearing ball 55, measured in three planes, may typically exhibit a maximum deviation from a true sphere up to 10 µin, while a Grade 5 bearing ball may exhibit a maximum deviation from a true sphere up to 5 µin. The manifestation of errors arising from these bearing ball errors may, or may not, repeat depending on how the balls 55 are rolling in the race 57. For correction purposes, it is important that sufficient data is collected to separate the repeatable errors from the non-repeatable errors.

Other factors are known to influence the generation of point run-out error in a bearing assembly 50. For example, in satellite applications, the change in temperature of the components will cause the various elements of the bearing assembly 50 to contract or expand. Accordingly, temperature changes may therefore interfere with the repeatability of the errors, as well as the performance of the bearing assembly 50.

It is expected that for a satellite 10 having a lifetime of up to 13 years, the bearing balls 55 and the rings 51, 53 will wear and that calibration for repeatable run-out may need to be updated. Therefore, long term performance requirements for a satellite 10 necessitates having a way to compensate for run-out on an ongoing basis.

Azimuth Tilting Errors. Having established herein that the run-out error includes both repeatable and non-repeatable components, approximations of the pointing direction errors caused by bearing race radial run-out and ball tolerances may be made. Consider the bearing assembly 50 presented in FIG. 5 deployed as an azimuth bearing 15.

Ideally the axes of the inner race 51 and outer race 53 will be coincident as illustrated in FIG. 5. (Note that FIG. 5 is not drawn to scale. For example, the gaps, shapes and angles shown therein are exaggerated.) As shown in the exemplary bearing assembly 50 illustrated in FIG. 5, the rolling elements 55 include a first course of rolling elements 55-1 and a second course of rolling elements 55-2. An angle alpha (α) is used to describe aspects of the bearing balls 55 in the first course 55-1 and the second course 55-2. Referring to FIG. 5, one can see that the bearing balls 55-1, 55-2 contact the raceways 57, 58 at certain points. To find alpha α, an axis is drawn that is normal to the axis of rotation Z of the bearing assembly 50. Another axis is drawn through the points of contact of the bearings 55-1, 55-2 as a "contact axis." The angle between the contact axis and the normal axis is referred to as the "contact angle," denoted as alpha (α).

Preferably, the angle alpha (α) is either 15° or 25°. In reality, both the rings 51, 53 and the rolling elements 55 include at least some imperfections, and hence the Z-axis of one ring 51 will deviate from the Z-axis of the other ring 53 as illustrated in FIG. 7.

II. An Algorithm for Estimating Error

Having presented some fundamental aspects of bearings, and the errors that affect the performance of a bearing, it is important to have a technique for assessing the effect of the bearing errors, and to provide for compensation therefrom. This section provides an embodiment of an algorithm (and derivation thereof) for assessing the errors in the accuracy of a pointing device (herein, a mirror) for a space-based application. It is recognized that other embodiments of algorithms may be appropriately used with the mechanisms set forth herein. It is considered that such other algorithms as may be used with the teachings herein are therefore within the contemplation of this disclosure.

Figure 7:
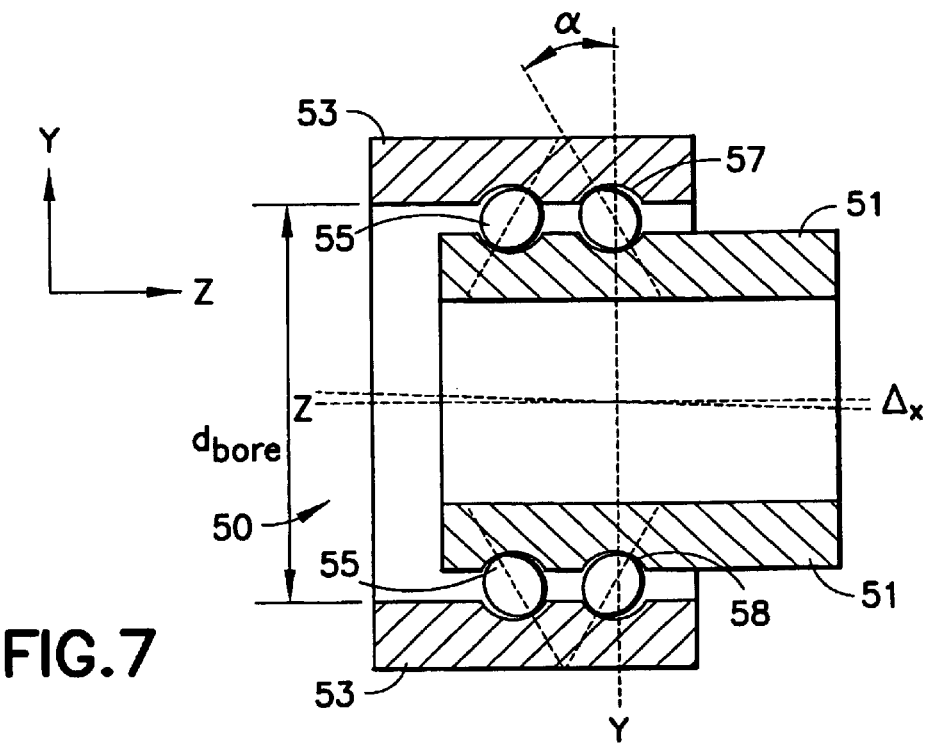
FIG. 7 is a cross sectional view of the components of the bearing assembly of FIG. 5, where one ring is not in alignment with another ring.

Using the bearing assembly 50 shown in FIG. 7 as the azimuth bearing 15, it is apparent that deviation of the axis of rotation in one ring 51 from the axis of rotation in the other ring 53 will cause tilting of the gimbal 14. A relationship can be established to estimate the deviation from true, wherein the deviation of the bore from the parallel $\Delta_x$ is estimated. This estimation assumes the worst case tilting, and that the azimuth outer ring 53 is fixed to the satellite 10. Using the diameter of the bore ($d_{bore}$) of the outer ring 53, and the assembled bearing outer ring face run-out with the ring 53 included ($S_{ca}$), the relationship is established as:

$$\Delta_x \approx \frac{S_{ca}}{d_{bore}}$$

Figure 8:
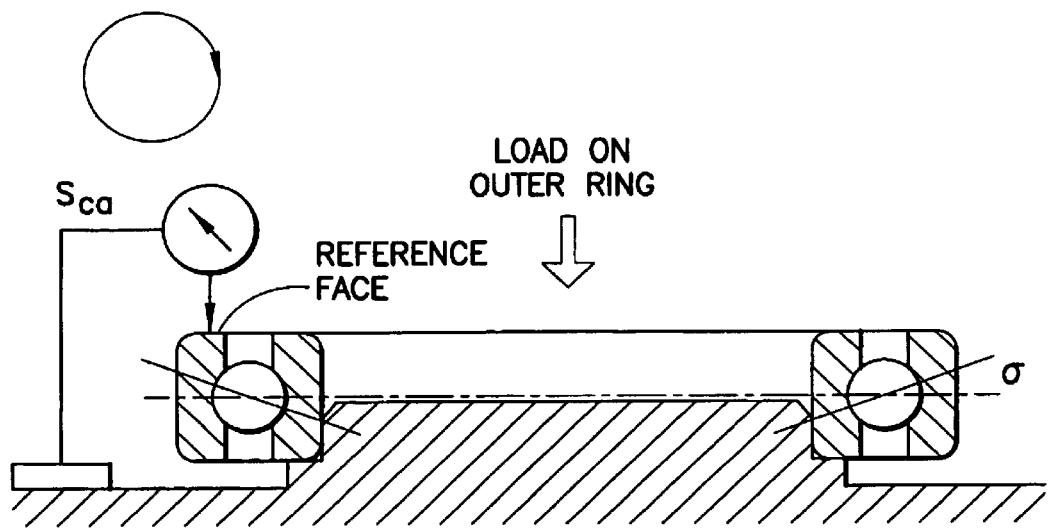
FIG. 8 is a cross sectional view of a bearing assembly, further showing a device for measuring a bearing outer ring face run-out with a raceway ($S_{ca}$)

Measurement of $S_{ca}$ includes reference face flatness, rolling element diameter variation and contact angle variation σ. Aspects of the measurement of $S_{ca}$ are shown in FIG. 8. Results of some typical measurements of $S_{ca}$ are given in Table 1. Table 1 provides exemplary measurement data for a bearing 15 having a bore diameter of 14 inches and outer diameter of 14.5 inches.

TABLE 1

| Bearing Type | $S_{ca}$ (0.0001 inches) | $\Delta_x$ (μrad) |
|---|---|---|
| ABEC 5 | 8 | 57 |
| ABEC 7 | 5 | 38 |
| ABEC 9 | 3 | 21 |

Figure 9:
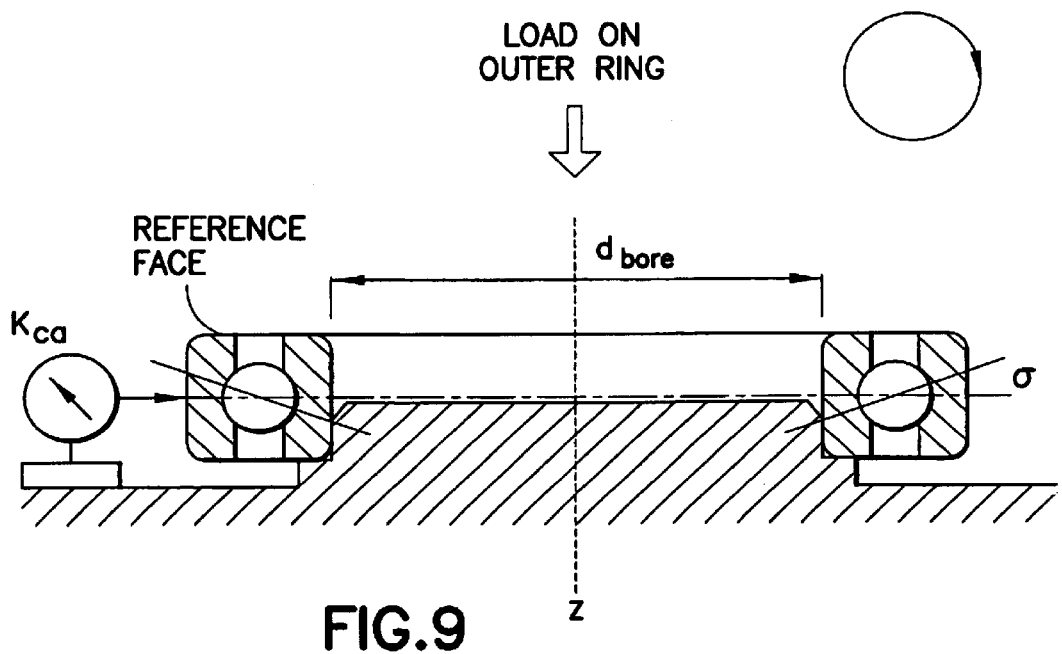
FIG. 9 is a cross sectional view of a bearing assembly, further showing a device for measuring a bearing outer ring raceway radial run-out ($K_{ca}$)

Elevation Tilting Errors. As shown in FIG. 4, the elevation axle 41 has the bearing 12, 13 at either end. Estimation of the elevation axis rotation error $\Delta_x$ may be calculated using the following relationship:

$$\Delta_x \approx \frac{2K_{ca}}{d}$$

wherein d is the length of the elevation axle 41 between the two bearings 12, 13; and, $K_{ca}$ is the raceway radial run-out of the assembled bearing outer ring 53. Aspects of the measurement of elevation axis rotation error are shown in FIG. 9. Results of some typical measurements of $K_{ca}$ are given in Table 2. Table 2 provides exemplary measurement data where d is 12 inches and the outer diameter of the bearings 12, 13 is 2 inches.

TABLE 2

| Bearing Type | $K_{ca}$ (0.0001 inches) | $\Delta_x$ (μrad) |
|---|---|---|
| ABEC 5 | 3 | 50 |
| ABEC 7 | 2 | 33 |
| ABEC 9 | 1.5 | 25 |

The values presented in Tables 1 and 2 use the assembled raceway run-out values of the bearings and therefore include both the repeatable and non-repeatable errors. For a typical satellite application, if the non-repeatable run-out is to be no more than 20% of the total, then ABEC 7 bearings would not meet the pointing repeatability requirement.

Sensitivity of Pointing Direction to Required Rotation. The following presents notation and definitions used in the analysis of the sensitivity of the system 10. The notation used herein, and the quantities represented are:

| | |
|---|---|
| az | Azimuth angle; |
| el | Elevation angle; |
| $\Delta_{el}$ | Angular error due to run-out in elevation bearing. Measured about an axis that is both in the mirror plane and perpendicular to the elevation axis. (This is the unit vector $\hat{x}$ when the mirror optical axis is directed toward the center of the target (earth). See FIGS. 1 and 2); |
| $\Delta_{az}$ | Angular error due to run-out in the azimuth bearing. Measured about a unit vector $\hat{k}$ normal to the azimuth bearing axis of rotation. The precise direction of $\hat{k}$ in this plane is generally unknown.; |
| $R_{\hat{k}}(\theta)$ | The rotation matrix about the unit vector $\hat{k}$; |
| MOA(az, el, $\Delta_{az}$, $\Delta_{el}$) | Function relating the unit vector Mirror Optical Axis (MOA) to azimuth, elevation, and run-out angle errors. This function is commonly called the "Forward Kinematics." |
| [k ×] | The matrix $\begin{bmatrix} 0 & -k_x & k_y \\ k_x & 0 & -k_x \\ -k_y & k_x & 0 \end{bmatrix}$ representing the cross product operation. That is satisfying [k ×]v = k × v |
| I | The 3×3 identity matrix $\begin{bmatrix} 1 & 0 & 0 \\ 0 & 1 & 0 \\ 0 & 0 & 1 \end{bmatrix}$ |

-continued

| | |
|---|---|
| $\hat{k}$ | The axis or rotation of the azimuth wobble (see FIGS. 1 and 2); |
| $\hat{x}$ | The unit vector along the azimuth x-axis (see FIGS. 1 and 2); |
| $\hat{y}$ | The unit vector along the azimuth y-axis (see FIGS. 1 and 2); and, |
| $\hat{z}$ | The unit vector along the azimuth x-axis (see FIGS. 1 and 2). |

Definitions of quantities herein include:

$$MOA\_ERROR \equiv MOA(az,el,\Delta_{ax},\Delta_{el}) - MOA(az,el,0,0);$$

and, $$moa\_error \equiv \|LOS\_ERROR\|.$$

Forward Kinematics for the Mirror Optical Axis. When the MOA is directed at the center of the earth then $MOA=\hat{z}$. When the azimuth, elevation, and run-out angles are non-zero, the MOA is rotated by a rotation matrix R such that $$MOA=R\hat{z}$$

where R can be factored (from right to left in the following) as elementary rotations about: 1) the axis of the elevation bearing tilt error, $R_{\hat{x}}(\Delta_{el})$, 2) the elevation axis, $R_{\hat{y}}(el-\pi/4)$, 3) the azimuth axis, $R_{\hat{z}}(az)$, and 4) the axis of the azimuth bearing tilt error, $R_{\hat{k}}(\Delta_{ax})$. Thus, the Forward Kinematics are represented as:

$$MOA(az,el,\Delta_{ax},\Delta_{el})=R_{\hat{k}}(\Delta_{ax})R_{\hat{z}}(az)R_{\hat{y}}(el-\pi/4)R_{\hat{x}}(\Delta_{el})\hat{z}$$

and $$MOA(az,el,0,0)=R_{\hat{z}}(az)R_{\hat{y}}(el-\pi/4)\hat{z}$$

where $$R_{\hat{z}}(az) = \begin{bmatrix} \cos az & -\sin az & 0 \\ \sin az & \cos az & 0 \\ 0 & 0 & 1 \end{bmatrix},$$

$$R_{\hat{y}}(el-\pi/4) = \begin{bmatrix} \cos(el-\pi/4) & 0 & \sin(el-\pi/4) \\ 0 & 1 & 0 \\ -\sin(el-\pi/4) & 0 & \cos(el-\pi/4) \end{bmatrix},$$

and, because the deltas are very small, $$R_{\hat{x}}(\Delta_{el}) = \begin{bmatrix} 1 & 0 & 0 \\ 0 & 1 & -\Delta_{el} \\ 0 & \Delta_{el} & 1 \end{bmatrix},$$

$$R_{\hat{k}}(\delta_{az}) = \begin{bmatrix} 1 & 0 & \Delta_{azy} \\ 0 & 1 & -\Delta_{azx} \\ -\Delta_{azy} & \Delta_{azx} & 1 \end{bmatrix}.$$

Therefore, $$MOA(az, el, 0, 0) = \begin{bmatrix} \cos az \cdot \sin(el-\pi/4) \\ \sin az \cdot \sin(el-\pi/4) \\ \cos(el-\pi/4) \end{bmatrix}.$$

For small angles, the approximation $R_{\hat{k}}(\Delta) \approx I+\Delta[\hat{k}x]$ is used. Also, $\hat{x} \times \hat{z} = -\hat{y}$ and $R_{\hat{y}}(el-\pi/4)\hat{y}=\hat{y}$ because $R_{\hat{y}}$ is a rotation about the y-axis. Finally, assuming that second order deltas can be ignored, the following holds true:

$$MOA\_ERROR \approx \Delta_{ax}[\hat{k}x]R_{\hat{z}}(az)R_{\hat{y}}(el-\pi/4)\hat{z}-\Delta_{el}R_{\hat{z}}(az)\hat{y}$$

where $$\Delta_{ax}[kx] = \begin{bmatrix} 0 & 0 & \Delta_{azy} \\ 0 & 0 & -\Delta_{azx} \\ -\Delta_{azy} & \Delta_{azx} & 0 \end{bmatrix}$$

and hence $$MOA\_ERROR = \begin{bmatrix} \Delta_{azy} \cdot \cos(el-\pi/4) - \Delta_{el} \cdot \sin az \\ -\Delta_{azx} \cdot \cos(el-\pi/4) + \Delta_{el} \cdot \cos az \\ \sin(el-\pi/4)(-\Delta_{azy} \cdot \cos az + \Delta_{azx} \cdot \sin az) \end{bmatrix}$$

Note that both "deltas" in the equation above multiply vectors having length less than or equal to one, so that an upper bound on the line of sight (LOS) error is:

$$moa\_error \leq \Delta_{el} + \Delta_{ax}$$

The upper bound can be achieved when the Mirror Optical Axis is pointed directly at the earth (i.e., $el=\pi/4$).

Compensation for Mirror Optical Axis (MOA) Errors. As shown above, bearing run-out directly affects the MOA_ERROR. Accordingly, a derivation is now set forth finding first order corrections to az and el to compensate for errors in the MOA. The desired result is to have a technique for updating the computed az and el based on a nominal model according to:

$$az \leftarrow az+\Delta az, \text{ and}$$

$$el \leftarrow el+\Delta el.$$

For a first order correction, the sensitivity (i.e., Jacobean matrix J) of MOA(az,el,0,0) to perturbations in az and el is found.

Recall that $$MOA(az,el,0,0)=R_{\hat{x}}(az)R_{\hat{y}}(el-\pi/4)\hat{z}.$$

A useful fact is $$\frac{d}{d\theta}R_{\hat{k}}(\theta) = \hat{k} \times R_{\hat{k}}(\theta),$$

so the 3 by 2 Jacobean matrix is defined as:

$$J(az, el) \equiv \frac{d}{d(az, el)} MOA(az, el, 0, 0)$$

$$= \left[\frac{d}{daz} MOA(az, el, 0, 0), \frac{d}{del} MOA(az, el, 0, 0),\right]$$

$$= [\hat{z} \times (R_{\hat{z}}(az)R_{\hat{y}}(el + \pi/4)\hat{z}), R_{\hat{z}}(az)(\hat{y} \times R_{\hat{y}}(el + \pi/4)\hat{z})]$$

$$= [\hat{z} \times MOA, (R_{\hat{z}}(az)\hat{y}) \times MOA],$$

which is expressed as:

$$J(az, el) = \begin{bmatrix} -\sin az.\sin(el + \pi/4) & \cos az.\cos(el + \pi/4) \\ \cos az.\sin(el + \pi/4) & \sin az.\cos(el + \pi/4) \\ 0 & -\sin(el + \pi/4) \end{bmatrix}$$

It is desired to adjust the MOA so as to negate the MOA_ERROR due to run-out. Hence, it is a goal to solve for $\Delta az$ and $\Delta el$ in $$J(az, el)\begin{pmatrix} \Delta az \\ \Delta el \end{pmatrix} = -MOA\_ERROR$$

Since J is full rank (=2) at all configurations except for the two where the MOA is parallel to the azimuth rotational axis, this equation has a solution in all relevant configurations. Since the Jacobian matrix is not square, the solution cannot be expressed in terms of the inverse of the Jacobian matrix. An alternative expression is:

$$\begin{pmatrix} \Delta az \\ \Delta el \end{pmatrix} = -(J^T J)^{-1} J^T \ MOA\_ERROR$$

where the $(J^T J)^{-1} J^T$ is the "pseudo-inverse." $J^T J$ is diagonal and therefore easy to invert as long as the diagonal terms are non-zero. (Note that when the MOA is pointed directly at the target 5 at least one of the diagonal values will be zero). In fact $$(J^T J)^{-1} = \begin{bmatrix} \frac{1}{\sin^2(el - \pi/4)} & 0 \\ 0 & 1 \end{bmatrix}$$

$$\begin{pmatrix} \Delta az \\ \Delta el \end{pmatrix} = -\begin{bmatrix} \frac{1}{\sin(el - \pi/4)}(\Delta_{el} - \cos(el - \pi/4)(\Delta_{azy}\sin az + \Delta_{azx}\cos az)) \\ (\Delta_{azy}\cos az - \Delta_{azx}\sin az) \end{bmatrix}$$

The feedback control algorithm, which generally accounts for measured bearing errors, is generally stated as:
  a. Measure the errors of the azimuth and the elevation bearings;
  b. Compute the MOA_ERROR;
  c. Compute the Jacobean matrix;
  d. Solve for $\Delta az$ and $\Delta el$; and,
  e. Implement the computed corrections.

This algorithm is preferably implemented on the satellite 10 using the computing power on board. The algorithm may also be implemented using ground based computing capabilities, so long as the impact of the delay in the feedback loop is acceptable. Accordingly, software running on board the satellite 10 may communicate as necessary with a remote station, such as a ground based computer.

It is considered that bearing error is a fraction of the total two-axis gimbal line-of-sight (LOS) error. It is recognized that possible sources of two-axis gimbal LOS errors include: inaccurate configuration of the component pieces (e.g., right angles are not precisely square); encoder and zero position error; vibration, wobble, resonances; thermal distortions; bearing repeatable error; and, bearing non-repeatable error.

The impact of bearing error can be minimized with calibration, good manufacturing and use of good equipment. However, it is considered that bearing errors cannot entirely be removed by calibration, or reduced to a negligible amount simply with good manufacturing or the use of good equipment. Examples of errors that will remain, regardless of minimization efforts, will include thermal distortions and non-repeatable bearing errors. Each of these errors can occur in different and unpredictable ways. Disclosed herein are techniques that provide for measuring and correcting error from non-repeatable bearing error. These non-repeatable bearing errors can be measured to a high degree of accuracy ($\leq \pm 1\%$) using proximity sensors.

It is considered that after calibration of the system as disclosed herein, non-repeatable bearing error may contribute up to 50% of the total two-axis gimbal LOS error, and possibly as much as 80%, as the repeatable error component will have significantly decreased.

II. Methods of Measuring Error

The techniques disclosed herein employ proximity sensors (also referred to herein as "probes") for measuring the RPR and NRPR. In this section, exemplary embodiments of bearing assemblies 12, 13, 15 equipped with a plurality of probes are disclosed, as well as some of the advantages and disadvantages of each embodiment. Also disclosed are aspects of the proximity sensors.

Under optimal conditions, it is possible to measure distances from an object with nanometer accuracy using a proximity sensor. For the space-based application herein, measurements may be taken before the system 10 is placed into service, as well as on an ongoing basis. Preferably, initial measurements are taken to provide calibration data, and therefore provide a basis for compensating from RPR. Ongoing measurements may be used to update existing calibration data, to account for all run-out, and to address changes due to wear. The data collected from the proximity sensors could be used in a variety of ways, including, without limitation, measuring the tilting of the bearings from true, and either compensating for tilt in a feedback control loop, or compensating for the tilt in a subsequent image correction. The data collected from the eddy current proximity sensors represent "orientation" or "position" data of the pointing device, or components associated with the pointing device, and are used for computation of associated angular error. Preferably, the data are indicative at least the angular position and magnitude of error producing features. One non-limiting example of an error producing feature is a high point in the shaft to which the pointing device is mounted.

First, consideration is given to measuring the tilting error in the azimuth bearing 15. The tilting of the azimuth bearing 15 occurs from rotation about an axis $\hat{k}$ normal to the azimuth axis of rotation Z, and can be resolved as rotations about the coordinate axes X and Y, as will be discussed further herein. However, the tilting can be measured using two dual channel proximity sensors, or three single channel sensors. Preferably, dual channel sensors (also referred to as "differential sensors") are used. Dual channel sensors are preferred, as these sensors measure the same gap from opposing directions and, hence, reduce measurement error.

The sensors are referred to herein interchangeably as "proximity sensors," "eddy current proximity sensors," and "probes." In general, these terms are expressive of a measurement system that is a contactless displacement measurement system. As disclosed herein, the probes preferably operate using an eddy current principle. Further aspects of the proximity sensors are discussed later herein.

Aspects of three exemplary embodiments of using proximity sensors for monitoring run-out in the azimuth bearing 15 are now presented. In a first embodiment, the proximity sensors are attached to the inside of the outer ring 53. In the second embodiment, the proximity sensors are attached to the outside of the outer ring 53, wherein the sensors monitor a flange of the inner ring 51. In the third embodiment, the sensors are attached to the base 30 or the outside of the outer ring 53, and directed to a device attached to the inner ring 51. It should be recognized that other embodiments may be realized, and therefore the illustrated embodiments are only exemplary of probe placement.

Figure 10:
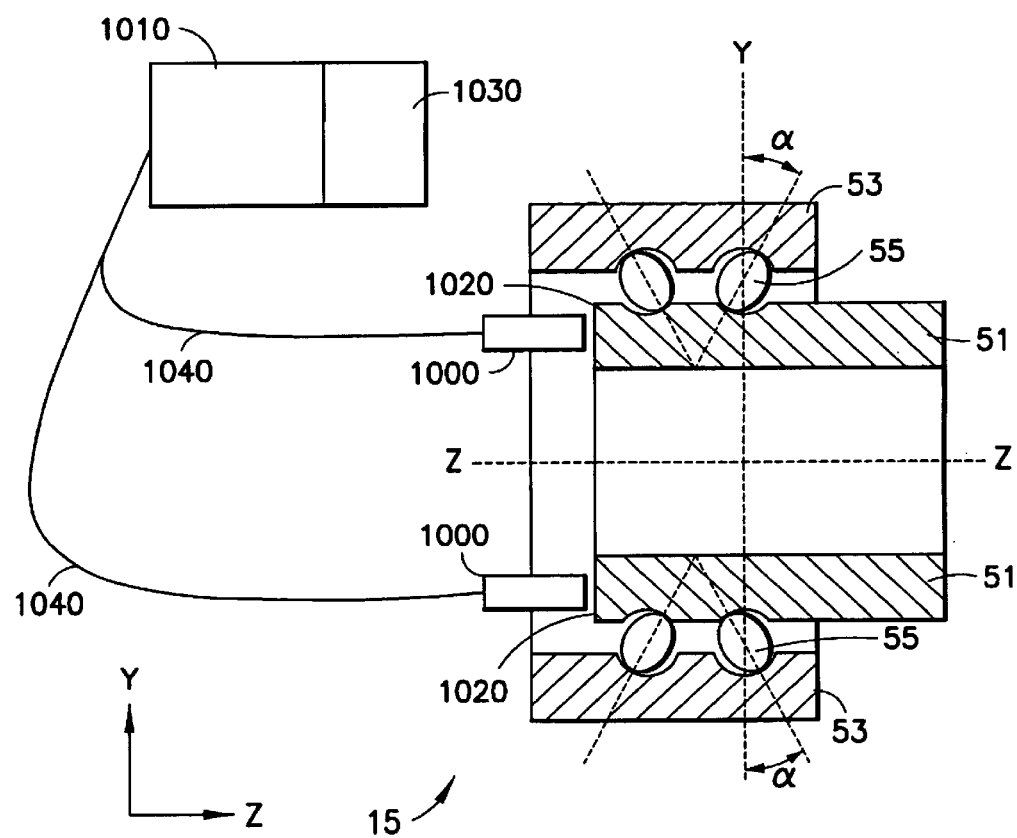
FIG. 10 is a schematic view depicting a first embodiment of a proximity sensor placement for measuring error in the azimuth bearing.

FIG. 10 shows the first embodiment. The probes 1000 are attached to the inside of the outer ring 53 of the azimuth bearing 15, and monitor the base of the inner ring 51. The probes 1000 are connected to appropriate signal processing equipment 1010 to provide the required data. The connection is preferably made by connection cables 1040. The signal processing equipment 1010 makes reference as required to external resources 1030. The external resources may contain, without limitation, information such as databases containing characterization data.

In this embodiment, the probes 1000 measure the distance from their respective mounting locations to the base 1020 of the inner ring. The measurements taken in this location include two components. The first component is the repeatable run-out derived from variation in the fabrication of the base 1020 of the inner ring. The second component is the tilt of the inner ring 51. The repeatable run-out can be removed by use of software using data from previously developed calibration tables.

Figure 11:
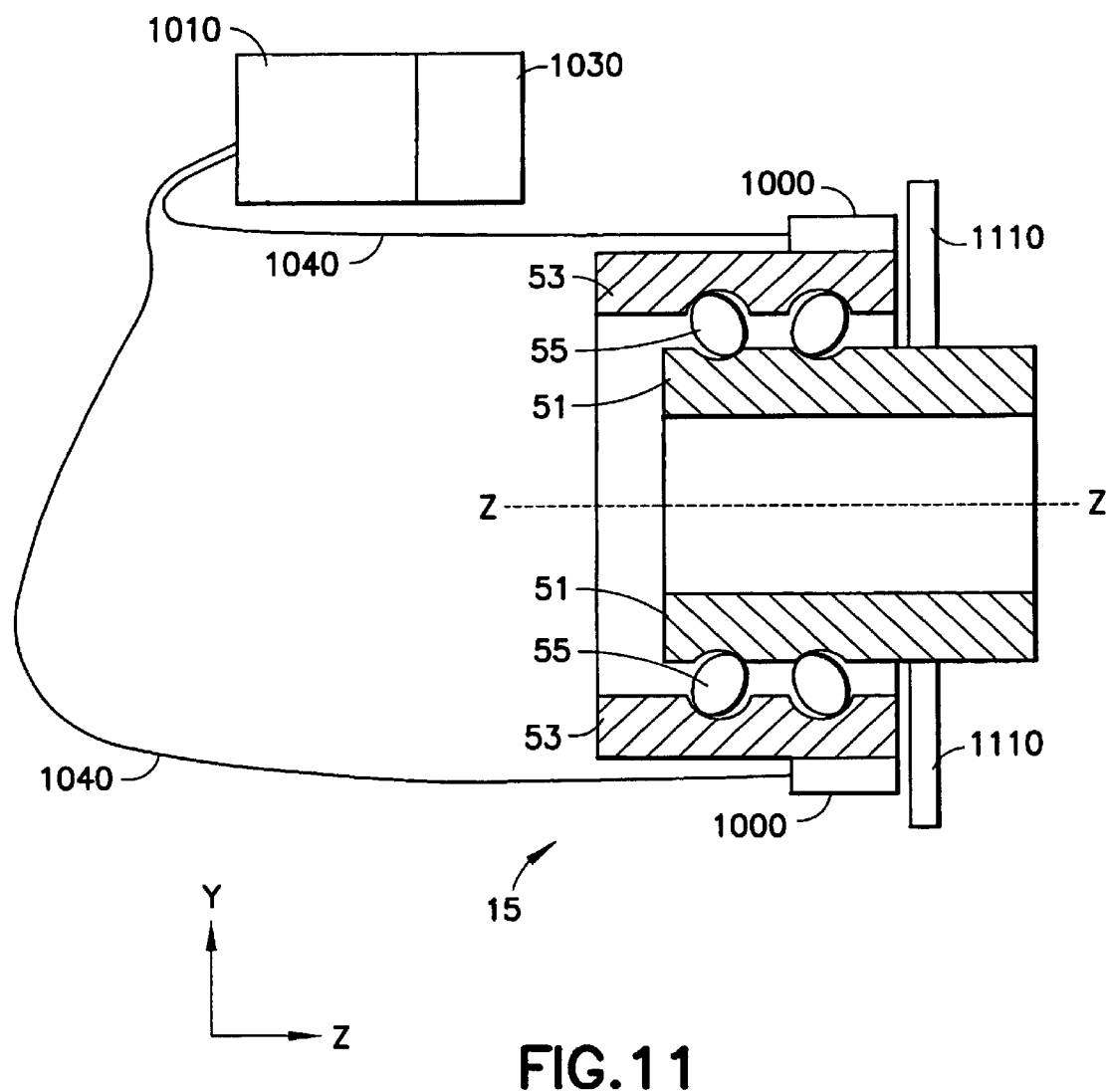
FIG. 11 is a schematic view depicting a second embodiment of a proximity sensor placement for measuring error in the azimuth bearing.

A second embodiment is presented in FIG. 11, where the probes 1000 are outside of the bearing 15. In this embodiment, a specially constructed target of a circular flange 1110 has been added specifically for monitoring by the probes 1000.

Figure 12:
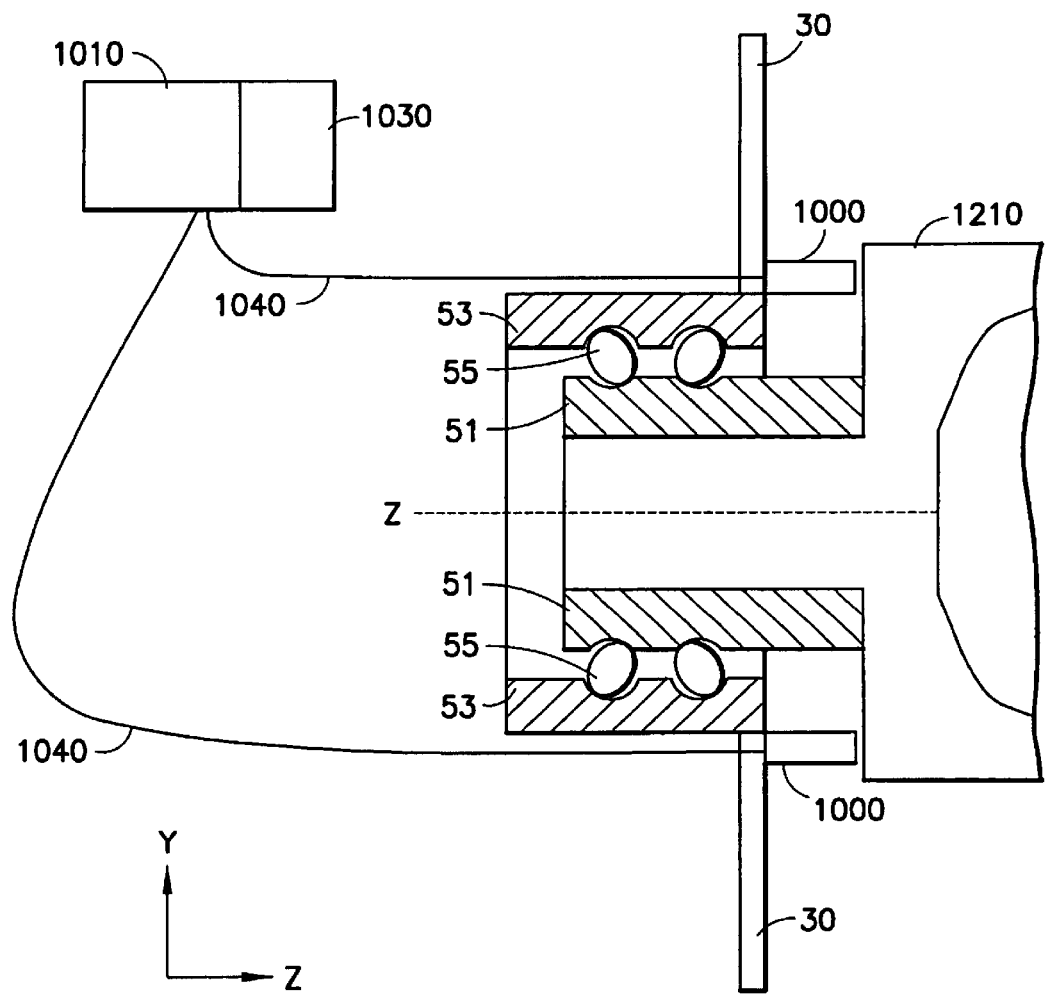
FIG. 12 is a schematic view depicting a third embodiment of a proximity sensor placement for measuring error in the azimuth bearing.

In the third embodiment, shown in FIG. 12, the probes 1000 are attached to the base 30 to which the outer ring 53 is also mounted, or the probes 1000 are attached to the outer ring 53. The probes 1000 are directed to a bottom portion of the elevation arms 1210, which are attached to the inner ring 51.

The first embodiment provides advantages in that the proximity sensors 1000 are insulated from thermal effects by mechanical shielding, at least to some extent. The proximity sensors 1000 deployed in the second embodiment may also be at least partially insulated. It is considered that the second embodiment provides advantages over the first embodiment in that connections to the proximity sensors 1000 may be simpler than that of the first embodiment. The third (and preferred) embodiment provides advantages in that additional material is not required to present monitoring targets for the eddy current proximity sensors 1000, the connections are simplified, and the sensors 1000 can obtain better data as they lie a greater distance from the center of the axis of rotation Z. Further, in the third embodiment, the sensors can measure tilting by other effects such as thermal distortion.

Figure 13:
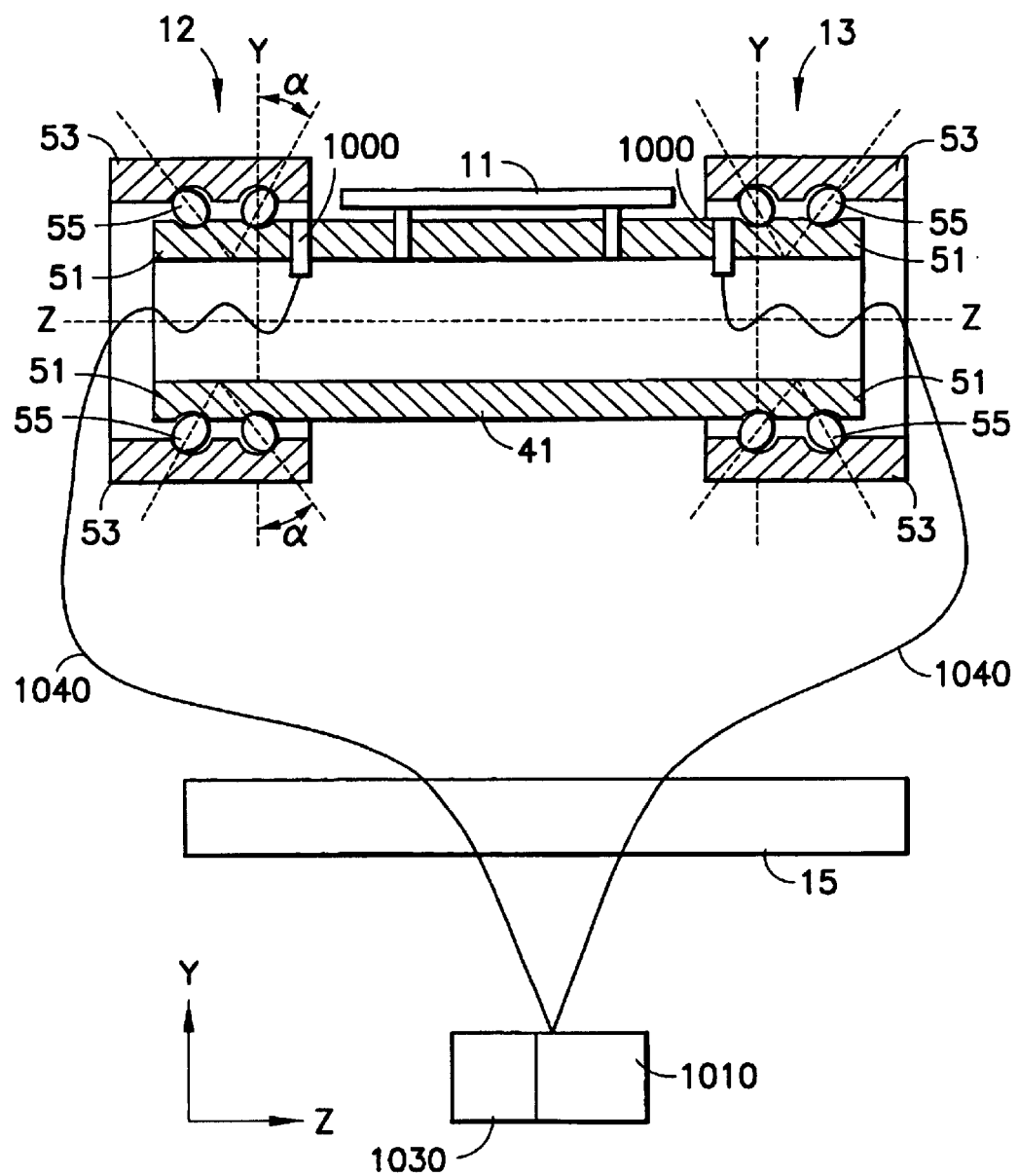
FIG. 13 is a schematic view depicting a first embodiment of a proximity sensor placement for measuring error in the elevation axis.
Figure 14:
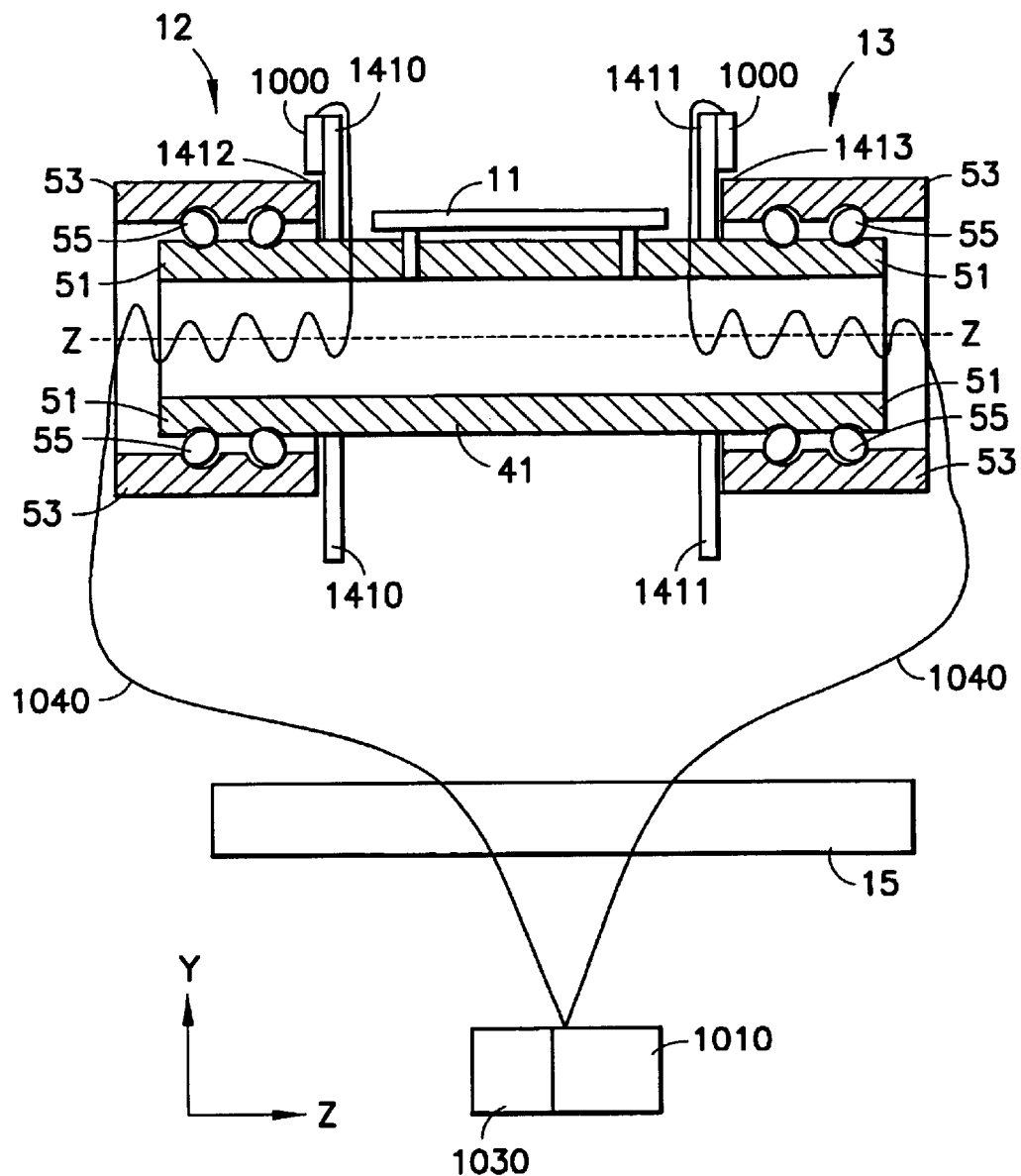
FIG. 14 is a schematic view depicting a second embodiment of a proximity sensor placement for measuring error in the elevation axis.
Figure 15:
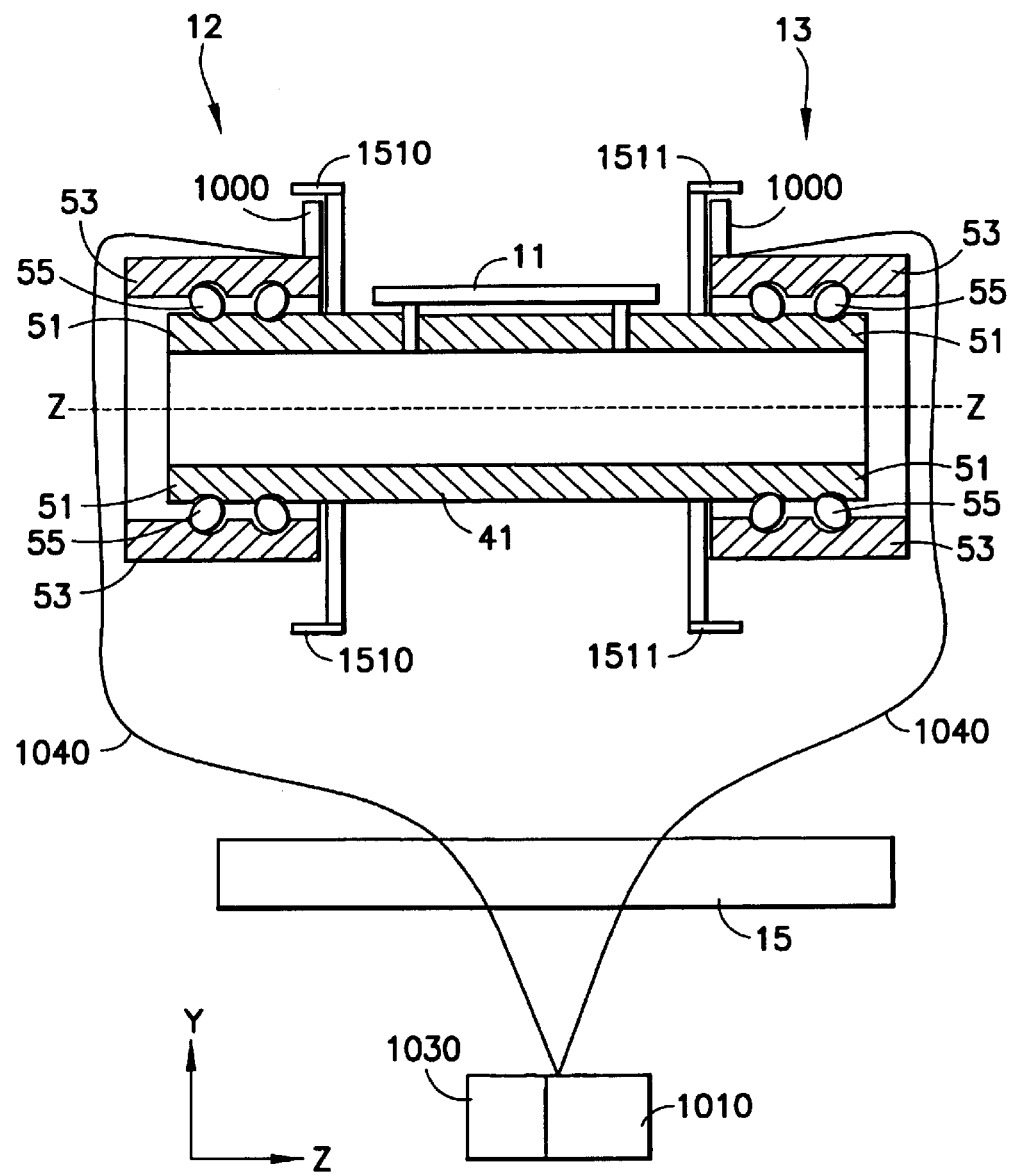
FIG. 15 is a schematic view depicting a third embodiment of a proximity sensor placement for measuring error in the elevation axis.

Referring to FIGS. 13–15, aspects of three exemplary embodiments of placement of proximity sensors 1000 for the elevation bearings 12, 13 are now presented. In a fourth embodiment of a measurement system, the proximity sensors 1000 are attached to the mirror side of the inside ring 51. In a fifth embodiment, the proximity sensors 1000 are attached to the outside of the inner ring 51, and directed to a flange of the outside of the outer ring 53. In a sixth embodiment, the proximity sensors 1000 are attached to the fixed outer ring 53, and directed to a special target flange on the existing inner ring flange.

Since rotation about the mirror normal has no optical impact, the tilting about the elevation bearings only needs to be measured around the x-axis of the mirror. Therefore, only one dual channel sensor is required. As shown in FIG. 13, preferably, a probe 1000 is mounted on each end of the elevation axle 41 perpendicular to the plane of the mirror.

FIG. 14 illustrates a fifth embodiment where the probes 1000 are attached to the mirror side of the elevation bearings 12, 13. The probes are attached to a respective flange 1410, 1411 using the fixed sides 1412, 1413 of the elevation bearing system as the target. It is considered that this embodiment provides for simpler mounting of the probes 1000 than in the first embodiment. The sixth embodiment, shown in FIG. 15, also avoids the complicated mounting requirements of the first embodiment, and further addresses wear of the connector cable 1040 from repeated movement.

FIG. 15 illustrates the sixth embodiment. In this embodiment, four probes 1000 are used (i.e. two differential sensors) as the probes 1000 are attached to the outer ring 53 and therefore their position relative to the surface of the mirror will change as the mirror 11 moves. The probes 1000 are attached to the fixed outer ring 53 of the elevation bearing 12, 13. Other probes 1000 (not shown) are located at right angles to the two probes 1000. Accordingly, the error perpendicular to the plane of the mirror 11 could be calculated. In this embodiment, a target flange 1510, 1511 is preferably attached to the inner ring 51 of each of the elevation bearings 12, 13.

The fourth embodiment, shown in FIG. 13, provides advantages, such as shielding of the probe 1000 from thermal effects, and a configuration where only one differential sensor 1000 is required. It is considered that the fifth embodiment, shown in FIG. 14 (using just one pair of probes 1000 attached to an extra flange 1410, 1411), appears to be the most advantageous. That is, the fifth embodiment also uses only one differential sensor 1000, and in this embodiment, the sensor 1000 apparatus is relatively simple to attach and use. Further, the cable route can be planned so that the effect on the cable 1040 of repeated turning is minimal. However, the sixth embodiment (FIG. 15) is also considered advantageous, as the probes 1000 do not affect the dynamics of the mirror 11, are simple to mount, and minimal cable 1040 flexion occurs during operation.

The foregoing figures and explanations have introduced aspects of the use of the proximity sensors 1000 with the azimuth bearing 15, and the elevation bearings 12, 13. The introduction has simplified the apparatus, and does not address all of the obstacles or requirements for implementation in a system 10. Some further detail and practical considerations are now presented.

Figure 16A:
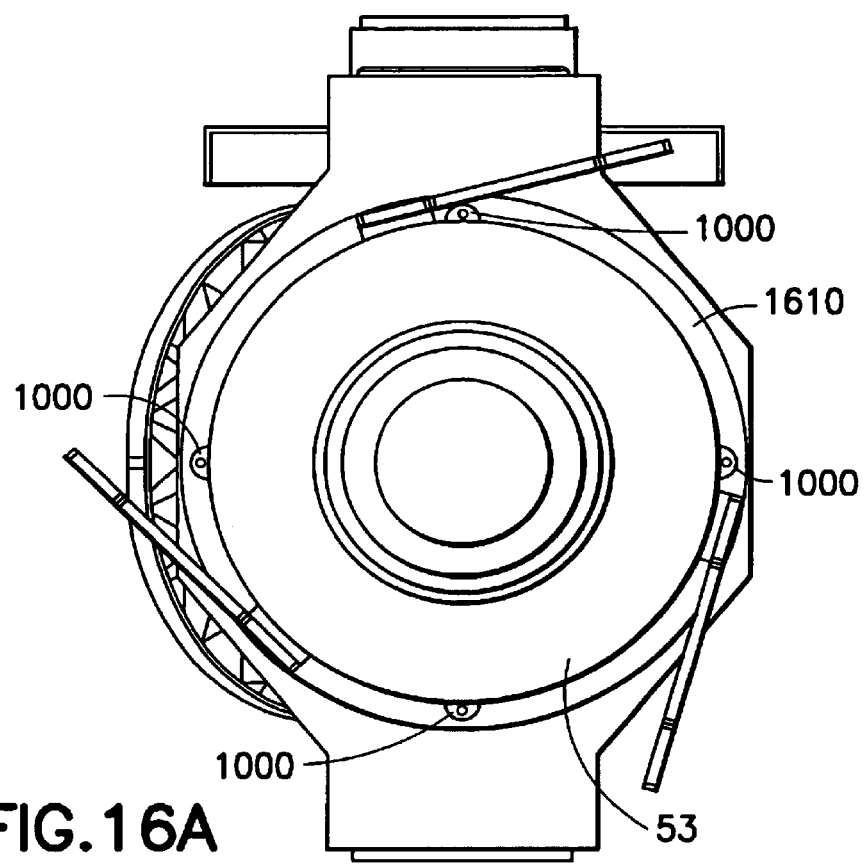
FIGS. 16A–B, collectively referred to as FIG. 16, show proximity sensors mounted on a gimbal.
Figure 16B:
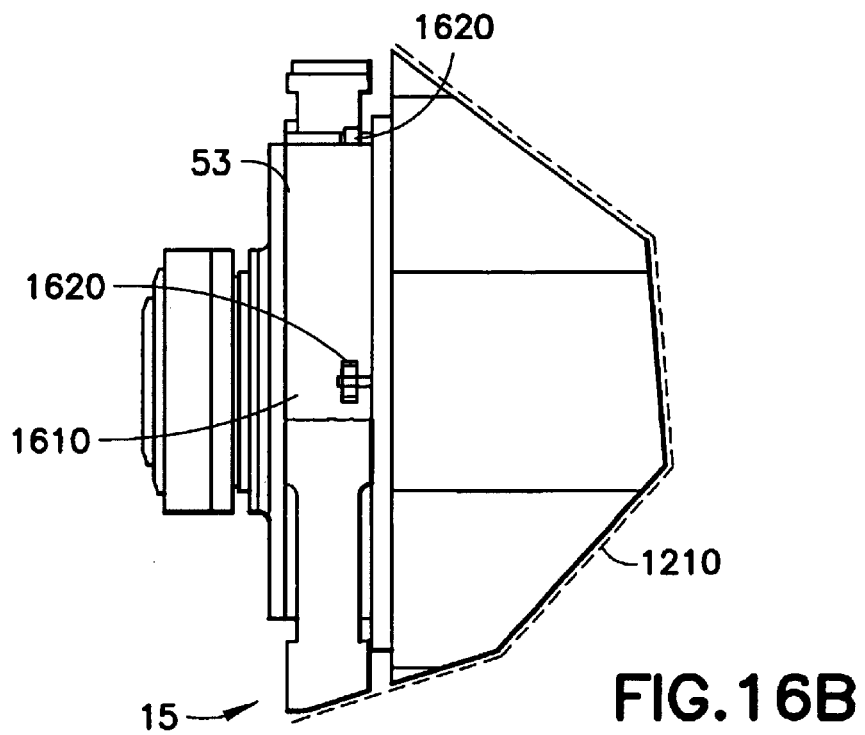

For example, FIGS. 16A–B and 17A–C, collectively referred to as FIGS. 16 and 17 respectively, show further aspects of sensors 1000 mounted on a gimbal 14. FIG. 16A illustrates the gimbal 14 from the bottom, where the bottom face 1611 of the azimuth bearing 15 is shown. Concentric with the bottom face 1611 is a target surface 1610 of the outside ring 53 on which the proximity sensors 1000 are mounted. FIG. 16B provides a side view of the azimuth bearing 15. In FIG. 16B, mounting flanges 1620 are shown mounted to the target surface 1610. Also shown in FIG. 16B is a cutaway illustrating a bottom portion of the elevation arms 1210, which are attached to the inner ring 51.

Figure 18B:
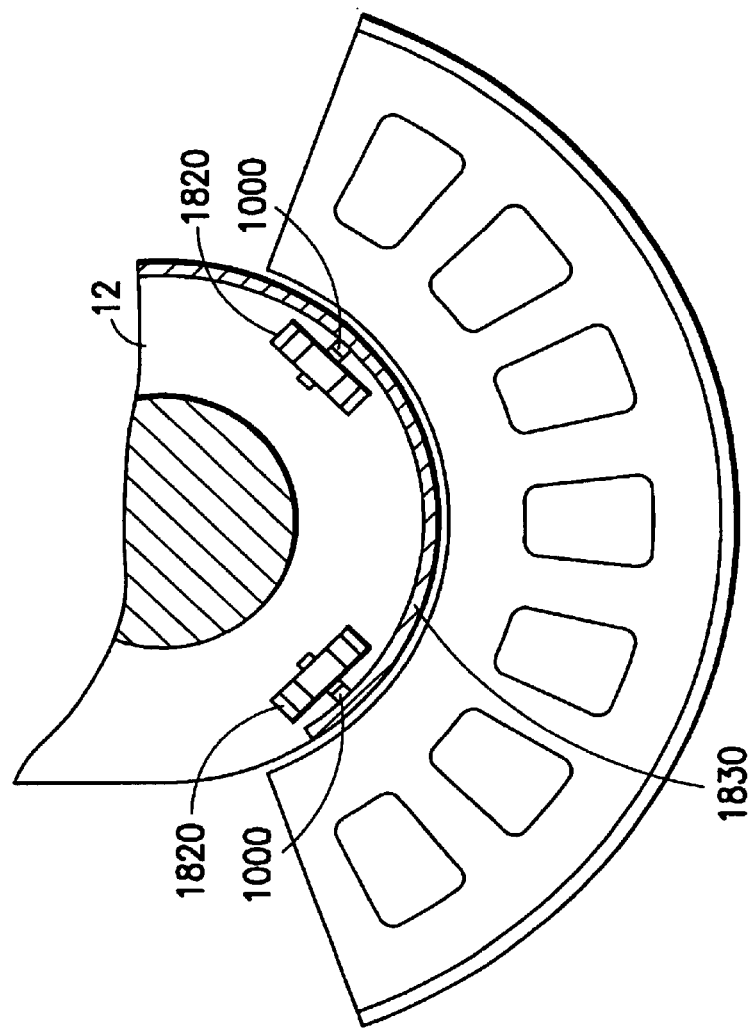
FIGS. 18A–B, collectively referred to as FIG. 18, is a schematic view showing one embodiment of the elevation arm on an angular measurement device side of the gimbal.
Figure 18A:
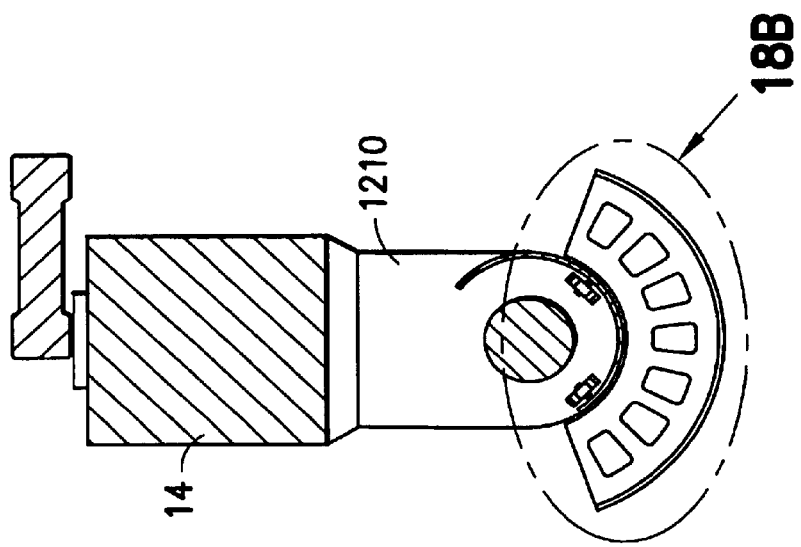

FIGS. 17A–C and FIGS. 18A–B, collectively referred to as FIG. 17 and FIG. 18, respectively, show further aspects of the gimbal 14. In FIG. 17A, the gimbal 14 is shown. Included are elevation arms 1210, which support the elevation bearings 12, 13, the elevation axle 41, and the mirror 11. In FIG. 17B, a side view of the elevation arm 1210 on the motor side is shown. The elevational motor bearing 13 is generally highlighted by the circled portion in FIG. 17B. The highlighted area is shown as an enlarged view in FIG. 17C. In FIG. 17C, the elevational motor bearing 13 is shown, with mounting flanges 1720 attached thereon. The mounting flanges 1720 hold the proximity probes 1000, which are positioned for monitoring of the target surface 1730.

In FIG. 18A, the elevation arm 1210 on an angular measure device side of the gimbal 14 is shown. In FIG. 18B, the elevational encoder bearing 12 is shown, with mounting flanges 1820 attached thereon. The mounting flanges 1820 hold the proximity probes 1000, which are positioned for monitoring of the target surface 1830.

Figure 19:
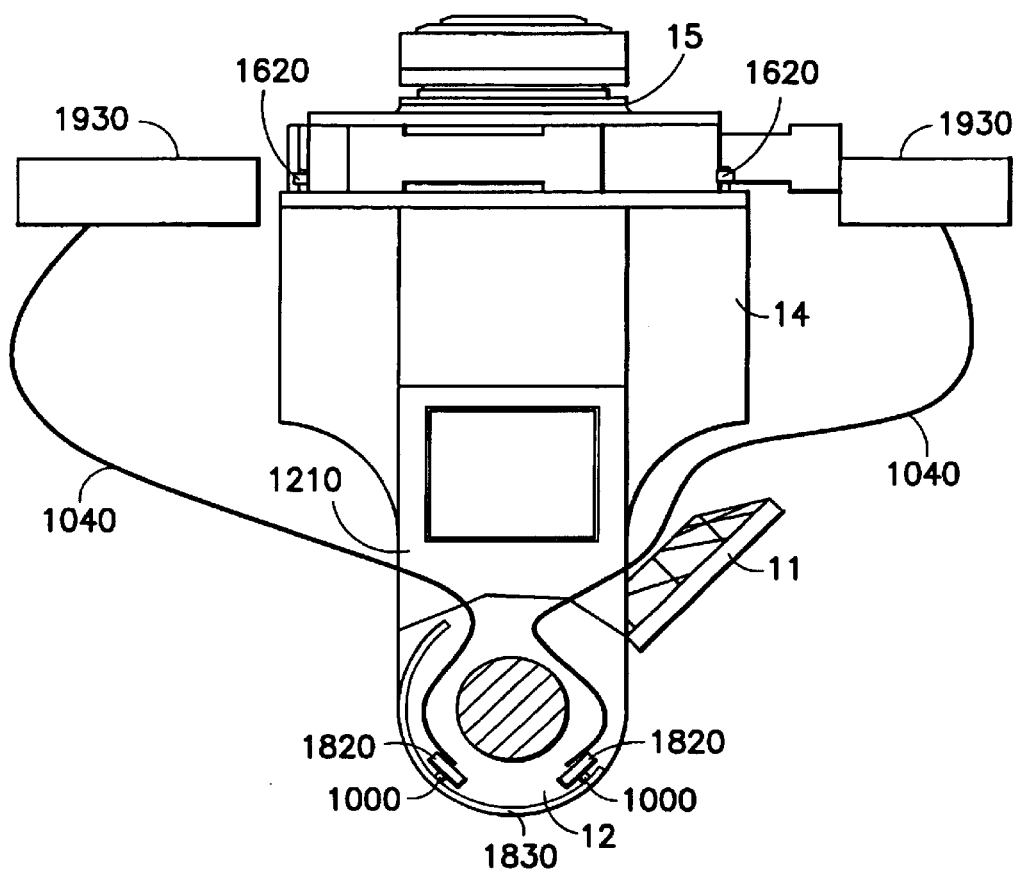
FIG. 19 is a schematic view showing one possible embodiment for locating proximity sensor cables across the azimuth axis for elevation probes.

FIG. 19 shows the gimbal 14 from a side view. In FIG. 19, portions of a bulkhead panel 1930, where the sensor cables 1040 travel from the sensors 1000 to the bulkhead panel 1930 are shown.

Examples of issues that should be addressed in the implementation of the foregoing system 10, includes designing a system 10 to withstand launching and long-term operation. Launching a satellite 10 can place a great deal of stress on the many components. Accordingly, the probes 1000 are preferably mounted securely. As proximity sensors 1000 often come threaded, locking bolts can be used to attach them securely. Preferably, space-qualified glue is applied to further secure the probes 1000.

The cables 1040 connected to the probes 1000 on the gimbals' arms 1210 must be able to withstand the repeated motion of the azimuth axis. For example, in one implementation of a satellite 10, the range of motion is about ±11°. During the projected lifetime of the satellite 10 in mode 5, it is expected that the satellite 10 will complete in excess of 800,000 scans, and will complete more than 1.5E6 load reversals. With careful placement of the cables 1040, the stress on the cables 1040 is slight despite the lifetime requirements for the satellite 10.

FIG. 19 shows one possible location of the cables 1040 across the azimuth axis for the elevation probes 1000. The cables 1040 are not kept closely aligned to the gimbal arms 1210. Instead, the cables 1040 are in free-space.

Preferably, for the azimuth bearing 15, the probes 1000 are attached to the fixed part of the azimuth bearing 15 and there is substantially no movement of the cables 1040. Therefore, few considerations are involved beyond a requirement for using space qualified cabling.

III. Measurement Tools

Proximity sensors 1000 which are suited for installation in the system disclosed herein are commercially available. This section presents some of the requirements for installation and use of the sensors 1000, and presents aspects of sensors 1000 qualified for use in a space-based application. As disclosed herein, the proximity sensors are "eddy current proximity sensors," and generally include at least one probe 1000 connected to a signal conditioner 1010.

The circuitry 1010 for interfacing with the sensors 1000 can be located in the central electronics unit of the satellite 10. The cable 1040 from the probes 1000 to the circuitry 1010 can be up to at least six feet long, which should be longer than needed for most installations of the proximity sensors 1000. In the preferred embodiment, output from the sensors 1000 is analog. An analog-to-digital converter is added to the circuitry 1010 to provide a digital signal.

Once in use, the sensors 1000 measure both the fabrication errors and the tilt errors. The fabrication errors are typically repeatable (within the limitations and qualifications provided above), and can therefore be measured and subtracted from the measurement to produce the tilt error.

Software is presently available that incorporates line-of-sight (LOS) error measurements to correct the images received. The proximity sensors 1000 therefore provide improved measurements, which can be input into existing LOS software, with some modification to provide for the use of new data produced the algorithm presented above.

Inductive proximity sensors 1000 are designed to operate by generating an electromagnetic field and detecting the eddy current losses generated when ferrous and nonferrous metal target objects enter the field. The target material must therefore be conductive. Proximity sensors 1000 are usually designed for a specified target material, such as a 1 mm thick iron or mild steel square with side lengths equal to the diameter of the probe, or three times the maximum measuring distance. It is recognized that other target materials can be used, but the sensing range will change accordingly. For example, if mild steel is the design target material and aluminum is used instead, then the sensing range should be corrected. That is, if the design sensing range is 5 mm for the mild steel, and aluminum is used (which has a correction factor of 0.4), then the resulting sensing range would be 5×0.4, or 2 mm.

Other factors that account for reduced sensing distances include conductance of the target material. Highly conductive materials create detection problems, and generally require reduced sensing distances. On the other hand, thin materials such as aluminum foil, hold the eddy-currents and make excellent targets for inductive sensing. Therefore, the targets should be conductive, but preferably not highly conductive. If the target material is not the design target material for the specific sensor 1000 used, then a correction factor may be used.

At least one commercially available proximity sensor 1000 is suited for use in the system disclosed herein. This is the Displacement Measuring System DMS 134 available from Vibro-meter S.A., of Fribourg Switzerland. Each DMS 134 system includes a signal conditioner (model number IQS 134) and can accept between one to four sensor probes (model number TQ 471). Because the DMS 134 can operate four probes 1000, only one DMS 134 system is required for the measurements on the azimuth bearing 15. Another DMS 134 system is required for monitoring of the elevation axis. Accordingly, in embodiments where the DMS 134 is used, only two such systems are required. Selected characteristics of the DMS 134 are given in Table 3.

TABLE 3

| Parameter | Displacement Measuring System DMS 134 | |
|---|---|---|
| | TQ 471 | IQS 134 |
| Measuring Range [mm] | +/- 0.5 differential | |
| Resolution [nm] | 1 | |
| Tip Diameter [mm] | 5 | |
| RTI Noise Floor [FSD/sqrt (Hz)] | 1.00 E-07 | |
| Linearity [%] | <0.5 Diff. | |
| Accuracy [%] | <1.1 | |
| Target dimensions | >3 × tip diameter | |
| Sensor Op. temp [K] | 123 to 398 [−150° C. to 125° C.] | |
| Tranducer Op. Pressure [bar] | Atmospheric to 10 E-05 mbar | |
| Frequency response [Hz] | DC to 16.5kHz (−3dB) | |
| Consumption (W) | <1.5 | |
| Weight transducer [g] | <100 | |
| Weight Conditioner [g] | <500 | |
| Electrical output | +/−5 VDC | |
| Applications | High Resolution Space Positioning | |
| Cable Length [m] | 1 to 2 on request | |
| Conditioner Op. Temperature [K] | 218 to 343 (−55° C. to 70° C.) | |
| Vibrations | tested up to 30 g rms | |
| Radiation level | 10 E 08 rad | |
| Designed for a lifetime of | 15 years | |
| Calculated reliability | 2,500,000 hours | |

The standard target for the DMS 134 is made of VCL-140 passivated steel. This is equivalent to SAE 4140. Aluminum AA7075/T7351 can also be used, but with reduced performance. Preferably, the target width should be at least three times the probe tip width. The DMS 134 provides a high level of accuracy and has been tested in extreme environments, which include large temperature variation, high levels of radiation and extreme vibration as might be experienced in a launch. The DMS 134 provides temperature measurement at the probe tips so the system can be calibrated at different temperature ranges and distributions. For rapid temperature changes, the DMS 134 may lose accuracy, but once the temperature stabilizes the accuracy should be recovered.

The DMS 134 includes a casing for the conditioner that is relatively heavy. As the electronics can be mounted inside the electronics compartment of the satellite 10, it is preferred to forego including the casing in order to reduce the total weight.

A series of tests of the efficacy of the proximity sensors 1000 was conducted. These tests were all completed at room temperature, using a BK Precision 2945 Multimeter (produced by BK Precision Corporation of Yorba Linda, Calif.), and a SR785 Signal Analyzer with a vibration isolation table (produced by Stanford Research Systems of Sunnyvale, Calif.). The tests were completed using four different target materials, and resulted in linearity equations for each of the materials. The tests were directed to four target materials, two involved VCL-140 (a steel alloy for which the proximity sensor has been optimized), one involved Aluminum, and the other involved Titanium. FIG. 20 presents an overview of the apparatus used for the testing.

In FIG. 20A, a test apparatus 2010 was developed for comparing the sensitivity of a probe 1000 to a target 1060. In FIG. 20A, the probe 1000 was coupled to appropriate circuitry 1010 via a cable 1040. The probe 1000 was anchored in a known position within the apparatus 2010. Series of measurements were taken for varied positions of the target 1060. The actual position of the target 1060 relative to the probe 1000 was known and controlled through readings and adjustments to a micrometer 1070. In the series of measurements, the cable 1040 was connected to a channel two of the circuitry 1010. Output signals, denoted by the arrow in FIG. 20A, were produced by the circuitry 1010, and evaluated through use of equipment illustrated in FIG. 20B.

In FIG. 20B, a multi-meter 1080 was used for linearity testing of the output signal from the circuitry 1010. Additionally, a differential amplifier 1083 (with gain set at 100, and having a bandwidth of 30 kHz) was coupled to a signal analyzer 1084 (having a bandwidth of 100 Hz and 10 kHz). The differential amplifier 1083 and the signal analyzer 1084 were used for noise testing of the output signal from the circuitry 1010. Table 4 summarizes the results of the tests.

TABLE 4

| Target material | Linearity equation (x = distance from the target, in) | Linearity (max error/ full range * 10^6) |
|---|---|---|
| VCL-140 CH1 | Output (x) = 128.5x − 0.104 [V] | 4250 ppm |
| VCL-140 CH2 | Output (x) = 129.4x − 0.018 [V] | 5780 ppm |
| Aluminum CH2 | Output (x) = 145.7x − 2.54 [V] | 34800 ppm |
| Titanium CH2 | Output (x) = 137.8x − 1.54 [V] | 22900 ppm |

Figure 21A:
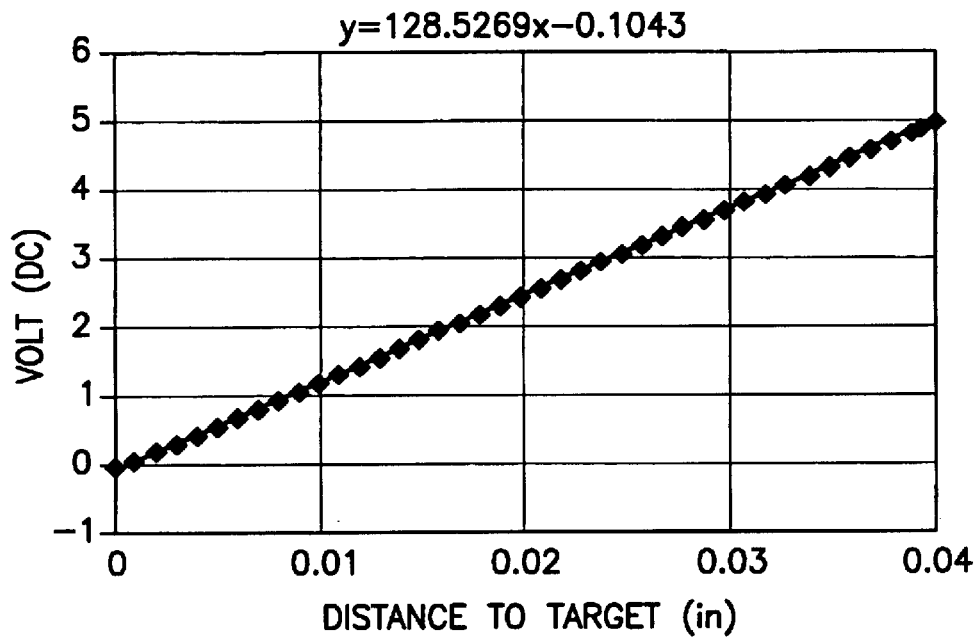
FIGS. 21A and 21B, collectively referred to as FIG. 21, provides graphic illustration of a measurement of distance from a sample of a passivated steel, referred to as "VCL-140"
Figure 21B:
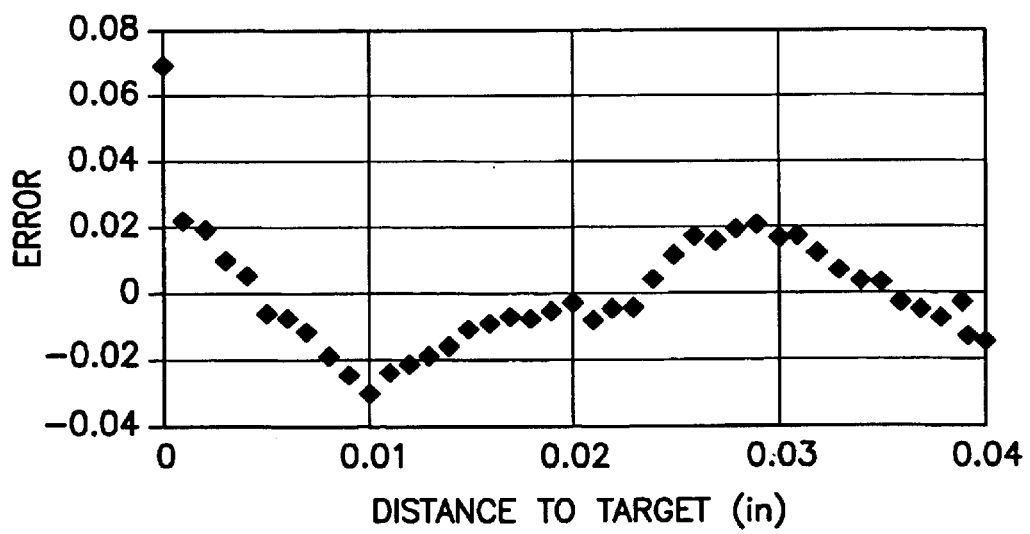
Figure 22A:
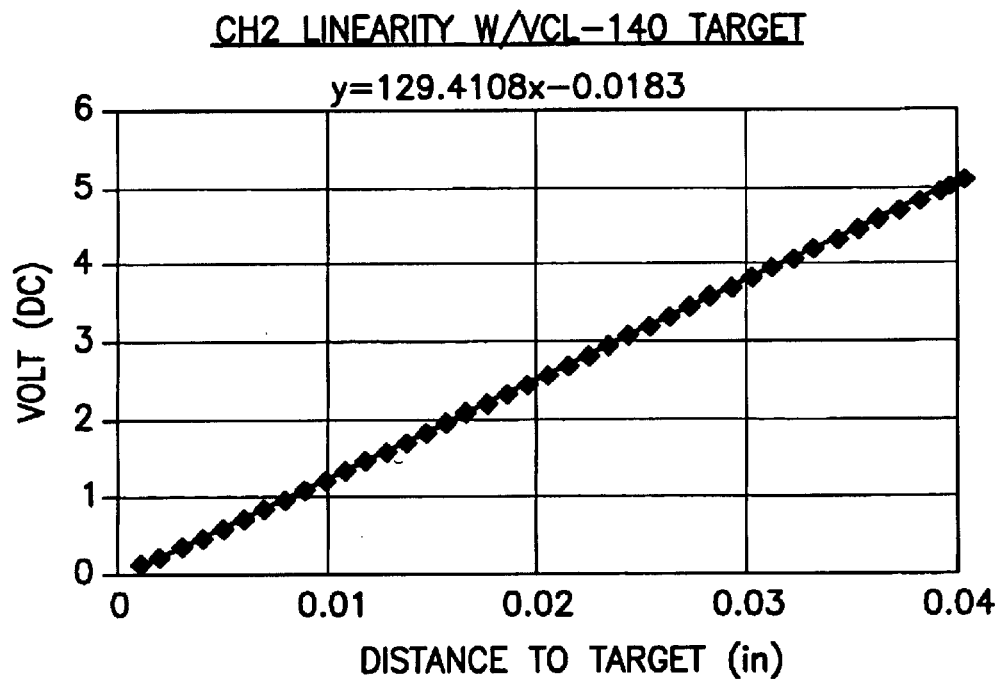
FIGS. 22A and 22B, collectively referred to as FIG. 22, provides graphic illustration of a second measurement of distance from a sample of VCL-140.
Figure 22B:
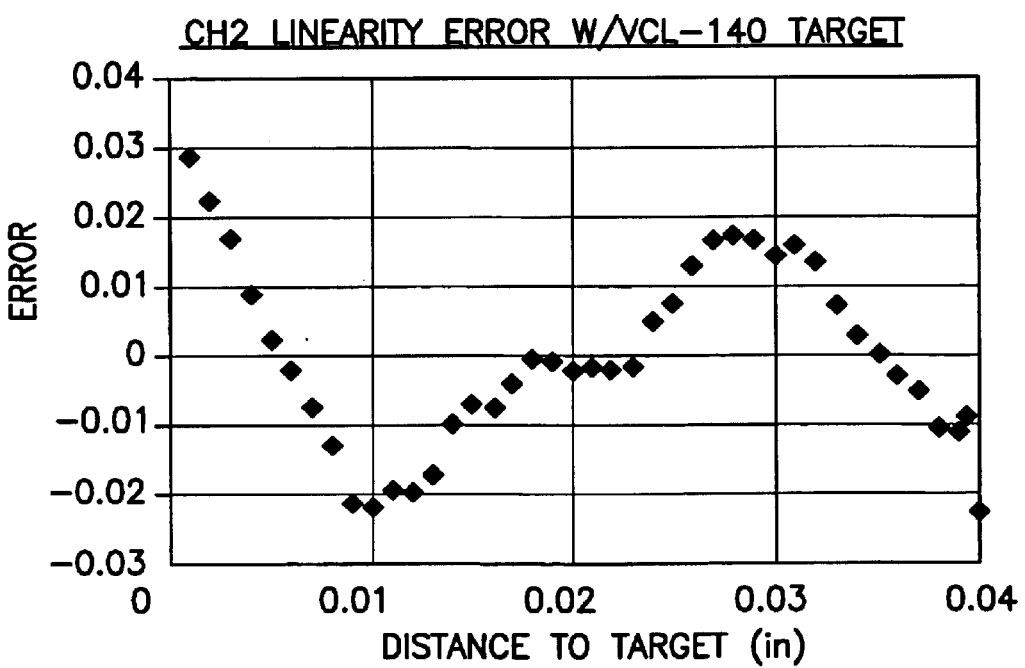
Figure 23A:
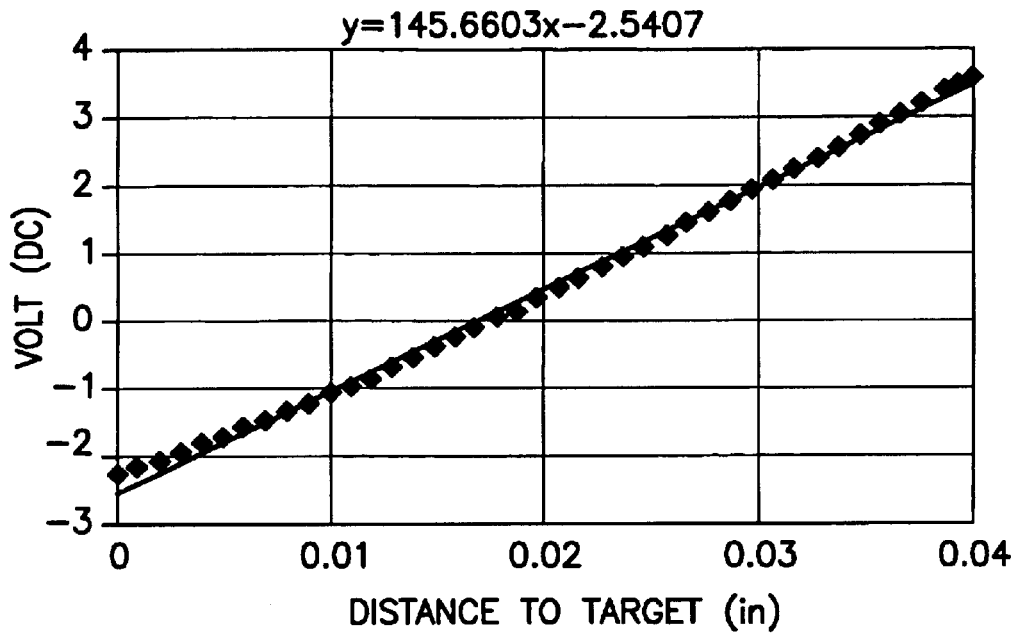
FIGS. 23A and 23B, collectively referred to as FIG. 23, provides graphic illustration of a measurement of distance from a sample of Aluminum.
Figure 23B:
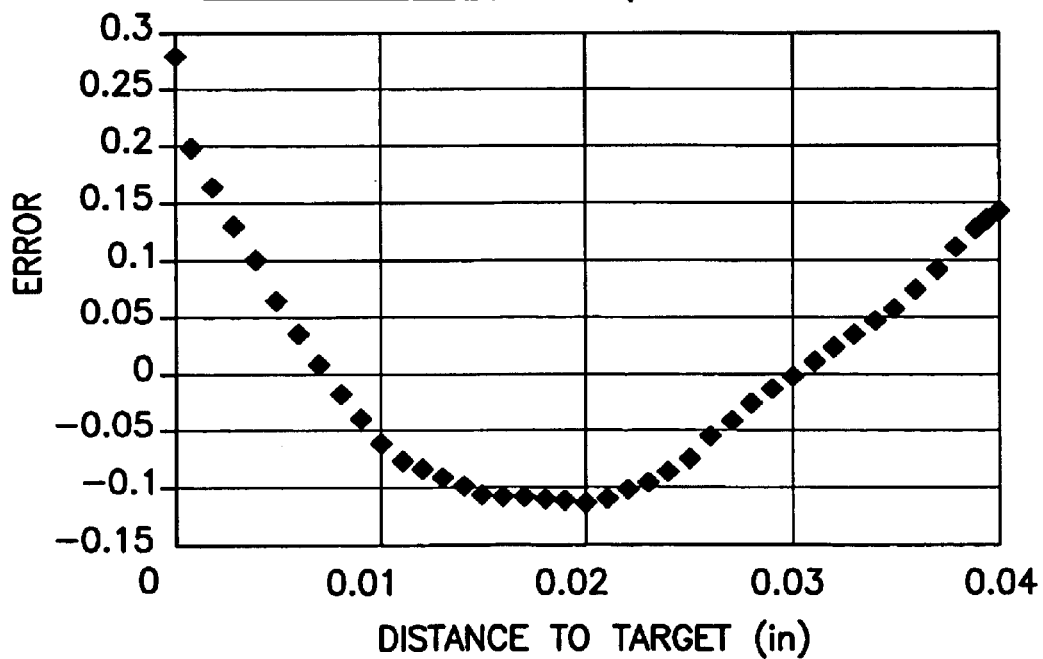
Figure 24A:
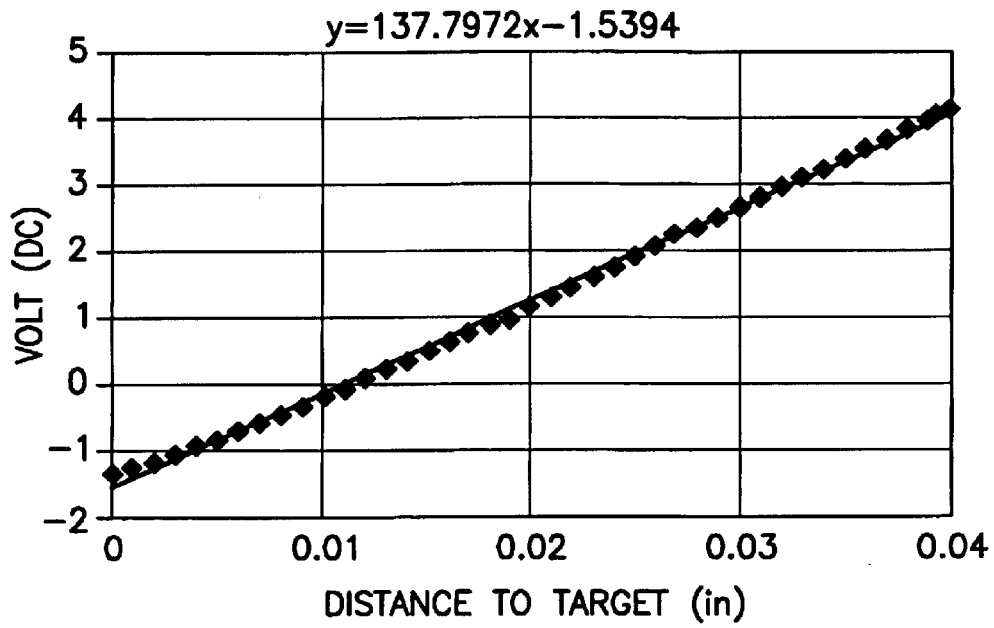
FIGS. 24A and 24B, collectively referred to as FIG. 24, provides graphic illustration of a measurement of distance from a sample of Titanium.
Figure 24B:
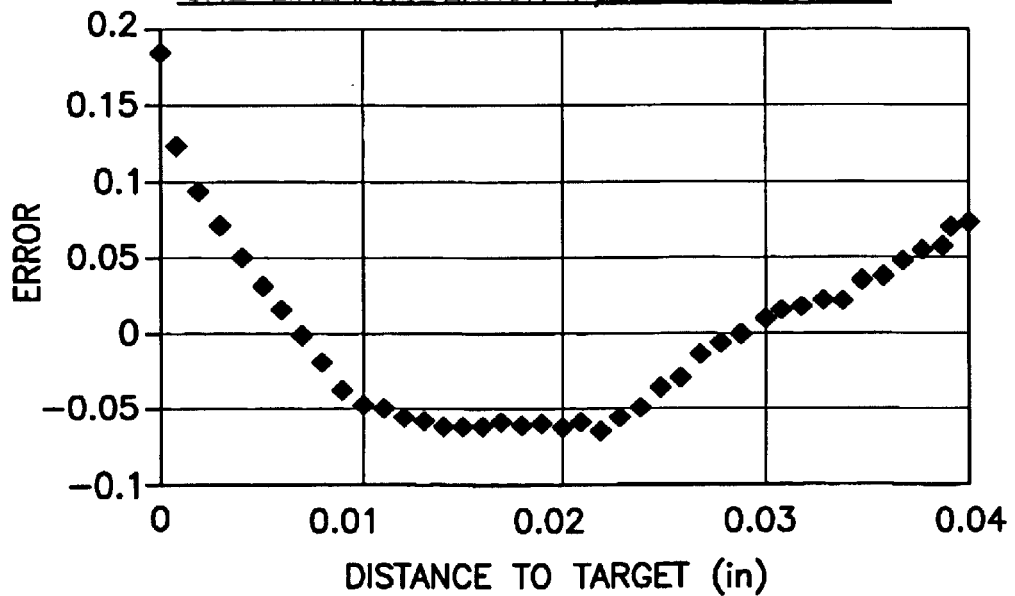

FIG. 21A provides a graph of the line fit for the VCL-140 CH1 with the corresponding data, and FIG. 21B depicts the relative error for the same target material. FIG. 22A provides a graph of the line fit for the VCL-140 CH2 with the corresponding data, and FIG. 22B depicts the relative error for the same target material. FIG. 23A provides a graph of the line fit for the Aluminum CH2 with the corresponding data, and FIG. 23B depicts the relative error for the same target material. FIG. 24A provides a graph of the line fit for the Titanium CH2 with the corresponding data, and FIG. 24B depicts the relative error for the same target material.

Other tests included measurements of noise density to produce integrated noise data. The noise density data was collected at three different frequencies, that of 0.1 kHz, 1 kHz, 10 kHz. The noise density data was also collected at three separate distances from targets 1060 formed of the VCL-140 CH2, Aluminum CH2 and Titanium CH2 target materials. Data from these tests are presented in Table 5.

TABLE 5

| Channel/ Material | Distance to target | Bandwidth | | | |
|---|---|---|---|---|---|
| | | 0.1 kHz | 1 kHz | 10 kHz | Units |
| CH 2 - VCL-140 | 0.00 in | 7.52 | 20.4 | 62.9 | $\mu V_{rms}$ |
| | 0.020 in | 9.47 | 24.5 | 75.5 | $\mu V_{rms}$ |
| | 0.0394 in = 1.0 mm | 11.8 | 30.6 | 94.3 | $\mu V_{rms}$ |
| | 0.00 in | 5.81E-08 | 1.58E-07 | 4.86E-07 | $in_{rms}$ |
| | 0.020 in | 7.32E-08 | 1.89E-07 | 5.83E-07 | $in_{rms}$ |
| | 0.0394 in = 1.0 mm | 9.12E-08 | 2.36E-07 | 7.29E-07 | $in_{rms}$ |
| | 0.00 in | 1.48E-09 | 4.00E-09 | 1.23E-08 | $m_{rms}$ |
| | 0.020 in | 1.86B-09 | 4.81E-09 | 1.48E-08 | $m_{rms}$ |
| | 0.0394 in = 1.0 mm | 2.32E-09 | 6.01E-09 | 1.85E-08 | $m_{rms}$ |
| CH 2 - Aluminum | 0.00 in | 5.20 | 13.5 | 41.5 | $\mu V_{rms}$ |
| | 0.020 in | 7.10 | 18.3 | 56.6 | $\mu V_{rms}$ |
| | 0.0394 in = 1.0 mm | 9.94 | 25.7 | 79.2 | $\mu V_{rms}$ |
| | 0.00 in | 3.57E-08 | 9.27E-08 | 2.85E-07 | $in_{rms}$ |
| | 0.020 in | 4.87E-08 | 1.26E-07 | 3.89E-07 | $in_{rms}$ |
| | 0.0394 in = 1.0 mm | 6.82E-08 | 1.76E-07 | 5.44E-07 | $in_{rms}$ |
| | 0.00 in | 9.07E-10 | 2.35E-09 | 7.24E-09 | $m_{rms}$ |
| | 0.020 in | 1.24E-09 | 3.19E-09 | 9.87E-09 | $m_{rms}$ |
| | 0.0394 in = 1.0 mm | 1.73E-09 | 4.48E-09 | 1.38E-08 | $m_{rms}$ |

TABLE 5-continued

| Channel/ Material | Distance to target | Bandwidth | | | Units |
|---|---|---|---|---|---|
| | | 0.1 kHz | 1 kHz | 10 kHz | |
| CH 2 - Titanium | 0.00 in | 6.31 | 16.3 | 50.3 | $\mu V_{rms}$ |
| | 0.020 in | 8.52 | 22.0 | 67.9 | $\mu V_{rms}$ |
| | 0.0394 in = 1.0 mm | 11.0 | 28.5 | 88.0 | $\mu V_{rms}$ |
| | 0.00 in | 4.58E-08 | 1.18E-07 | 3.65E-07 | $in_{rms}$ |
| | 0.020 in | 6.18E-08 | 1.60E-07 | 4.93E-07 | $in_{rms}$ |
| | 0.0394 in = 1.0 mm | 7.98E-08 | 2.07E-07 | 6.39E-07 | $in_{rms}$ |
| | 0.00 in | 1.16E-09 | 3.00E-09 | 9.27E-09 | $m_{rms}$ |
| | 0.020 in | 1.57E-09 | 4.06E-09 | 1.25E-08 | $m_{rms}$ |
| | 0.0394 in = 1.0 mm | 2.03E-09 | 5.25E-09 | 1.62E-08 | $m_{rms}$ |

Based upon the results of the various tests, a preferred combination was identified, wherein the proximity sensors are operated at 1 kHz with a target 1060 formed of VCL-140.

IV. Software and Modeling

Data from the proximity sensors 1000 is converted into a form that can be used appropriately, such as for image correction or pointing direction correction implemented in a feedback loop. Techniques for making use of this data are now presented. Included in this section is a discussion of aspects the calibration of the measurement apparatus; and algorithm for making use of the measurement data; and, aspects of a computer based model for verification of the teachings herein.

Figure 25:
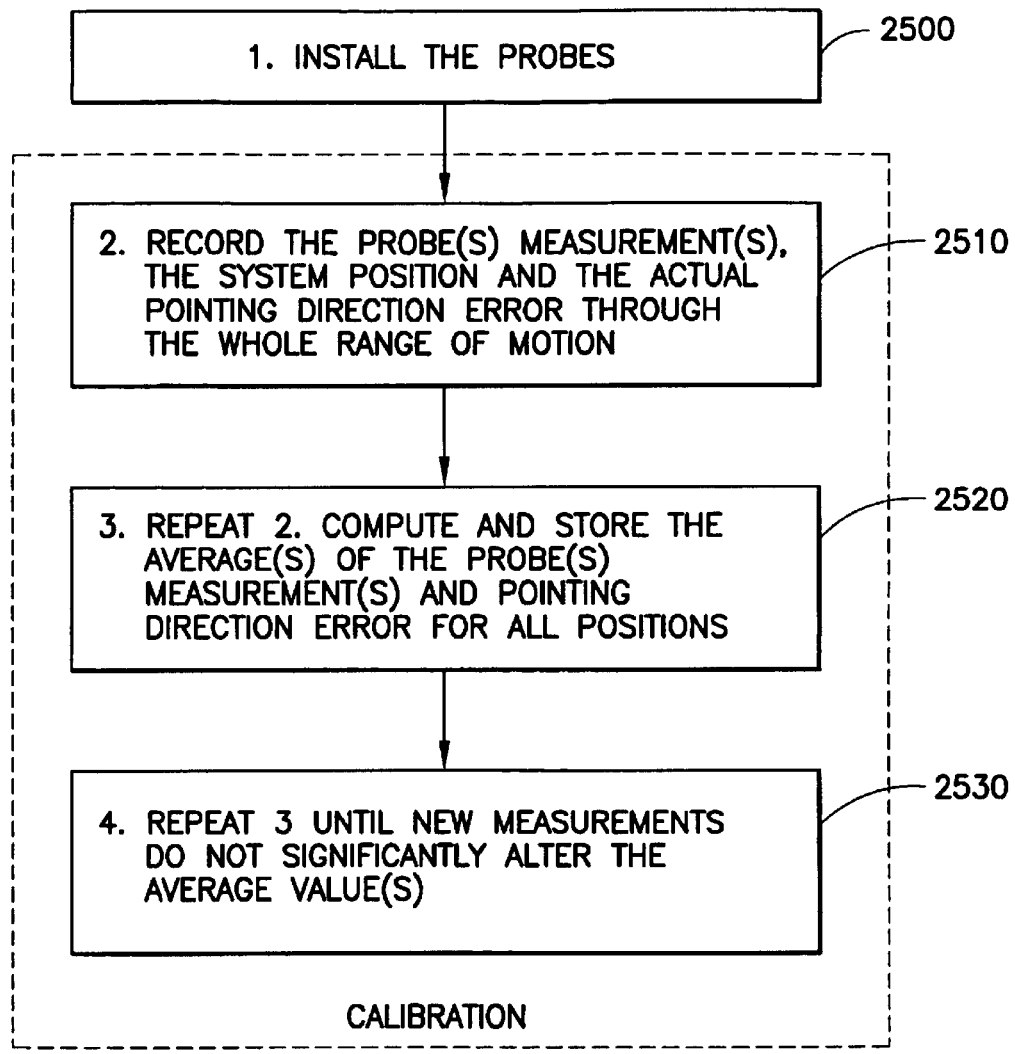
FIG. 25 is a flow chart showing the calibration of installed eddy current proximity sensors.

FIG. 25 is a flow chart depicting aspects of calibration of the proximity sensors 1000. Once the sensors 1000 have been installed in a first step 2500, each bearing 12, 13, 15 is moved through the full range of positions expected during operation. In a next step 2510, measurements are taken to characterize the RPR present in each bearing 12, 13, 15. A third step 2520 repeats the procedure of the second step 2510 until sufficient data has been collected. A determination is made in a fourth step 2530 that the measurement data has been reliably characterized. At this point, characterization is complete, and the characterization data may used as a reference during operation. Multiple calibrations may be completed, where the RPR is characterized under varying conditions, such as temperature.

Figure 26:
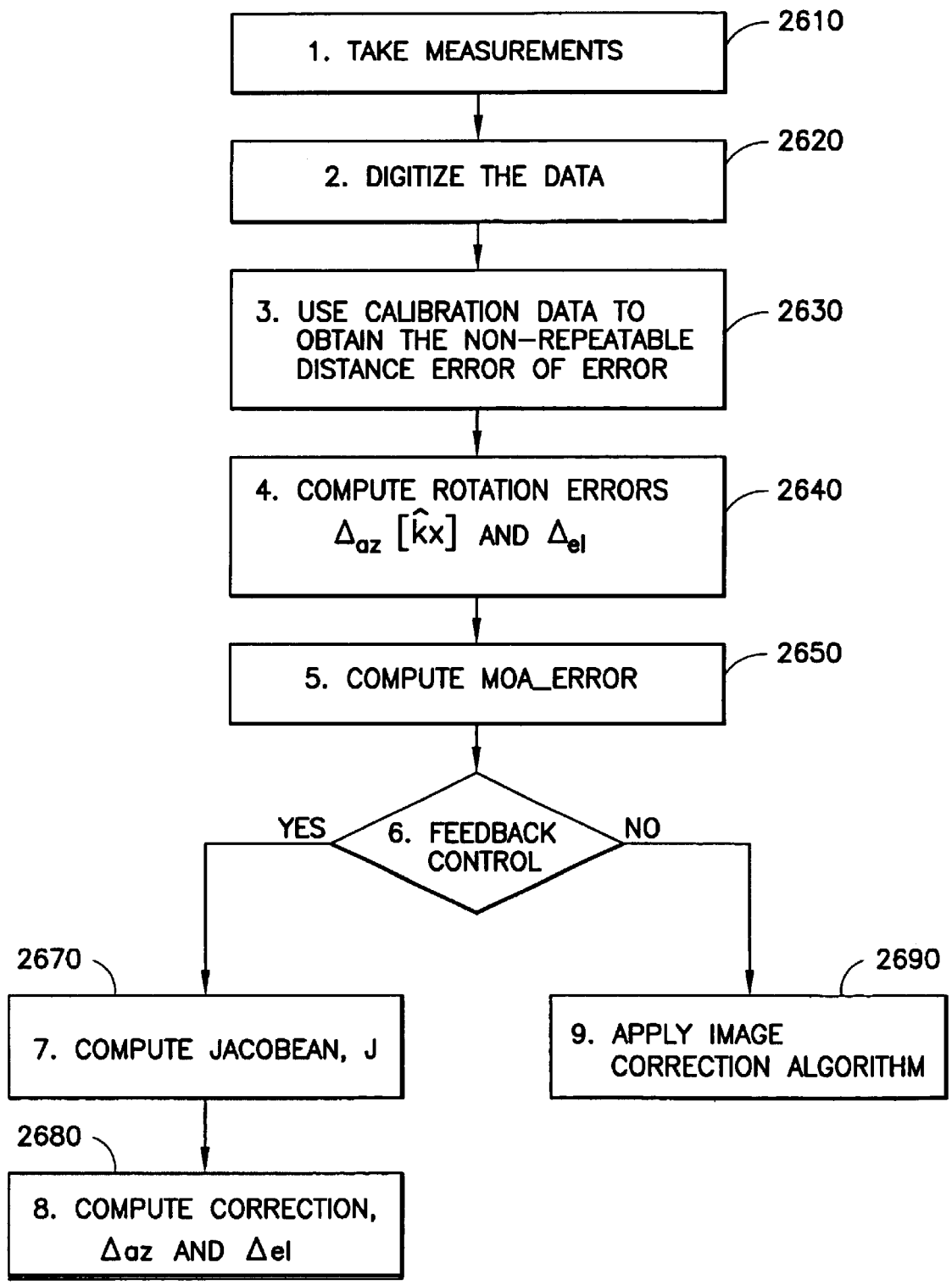
FIG. 26 is a flow chart showing the use of the eddy current proximity sensors for making measurements of bearing error.

FIG. 26 is a flow chart depicting aspects of operation of the proximity sensors 1000, and the use thereof for error correction. In a first step 2610, measurements are taken by the proximity sensors 1000. In one embodiment, measurements are taken at a rate of about 500 times per second. The sensors 1000 produce an analog voltage signal as an output. The signal is representative of the differential distance from the target 1060 for each of the probes 1000. As presented in an algorithm herein for computing errors, the output for the azimuth axis are expressed as:

| $S_{azx}$ | Differential measurement on the x-axis as an analog voltage; and, |
| $S_{azy}$ | Differential measurement on the y-axis as an analog voltage. |

Output for the elevation axis is expressed as:

| $S_{xel}$ | Differential measurement in the x-axis of the mirror axle as an analog voltage; and, |
| $S_{zel}$ | Differential measurement in the z-axis of the mirror axle as an analog voltage. |

Once the measurements have been taken, the data is then digitized using an analog to digital converter in a second step 2620. As expressed herein, the digitized information for the azimuth axis is expressed as:

| $ds_{azx}$ | $s_{azx}$ digitized; and, |
| $ds_{azy}$ | $s_{azy}$ digitized. |

Digitized information for the elevation axis is expressed as:

| $ds_{xel}$ | $s_{xel}$ digitized; and, |
| $ds_{zel}$ | $s_{zel}$ digitized. |

At this point, the digitized information contains both the repeatable and non-repeatable error components. As a third step 2630, the repeatable component is removed by making use of calibration data, wherein the RPR error is subtracted from the digitized data. For the azimuth axis, the NRPR is expressed as:

$$ads_{azx} = ds_{azx} - cds_{azx1} \text{ and,}$$

$$ads_{azy} = ds_{azy} - cds_{azy}.$$

For the elevation axis, the NRPR is expressed as:

$$ads_{xel} = ds_{xel} - cds_{xel1} \text{ and,}$$

$$ads_{zel} = ds_{zel} - cds_{zel}.$$

The notation $cds_{azx}$, $cds_{azy}$, $cds_{xel}$ and $cds_{zel}$ is representative of the values obtained during calibration for the RPR errors. The calibration values may have to be interpolated from the calibration tables if there is not a calibration value for that exact value of azimuth and elevation angles and temperature.

Subsequently, the differential distance of the non-repeatable errors is now converted into mirror optical angle error (MOA_ERROR). As a fourth step 2640, $\Delta_{ax}[\hat{k}x]$ and $\Delta_{el}$ are computed from the measurements taken. For any given position, there will be a repeatable pointing error that is added to the computed non-repeatable error. $\Delta_{az}[\hat{k}x]$ is computed as:

$$\Delta_{ax}[\hat{k}x] = \begin{bmatrix} 0 & 0 & \Delta_{azy} \\ 0 & 0 & -\Delta_{azx} \\ -\Delta_{azy} & \Delta_{azx} & 0 \end{bmatrix}$$

where:

$$\Delta_{azy} = \frac{ads_{azy}}{d_{axy}} + \Delta_{axy}^{cal},$$

$$\Delta_{azx} = \frac{ads_{azx}}{d_{axx}} + \Delta_{azx}^{cal}.$$

In the foregoing, $d_{azx}$ and $d_{azy}$ represent the distances between probe centers on the x and y axes respectively. $\Delta_{azx}^{cal}$ and $\Delta_{azy}^{cal}$ represent the calibrated error for the respective angles.

$$\Delta_{el} = \frac{ads_{xel}}{d_{xel}}\sin el + \frac{ads_{zel}}{d_{zel}}\cos el + \Delta_{el}^{cal}$$

where $d_{xel}$ and $d_{zel}$ are the distances between probe centers for the x-axis and z-axis probes respectively and $\Delta_{el}^{cal}$ is the calibrated error angle. The fifth step 2650 produces the mirror optical angle error (MOA_ERROR) by computing:

$$\text{MOA\_ERROR} \approx \Delta_{ax}[\hat{k}x]R_{\hat{x}}(az)R_{\hat{y}}(el+\pi/4)\hat{z} - \Delta_{el}R_{\hat{z}}(az)\hat{y}$$

$$\text{MOA\_ERROR} = \begin{bmatrix} \Delta_{azy}\cdot\cos(el+\pi/4) - \Delta_{el}\cdot\sin az \\ -\Delta_{azx}\cdot\cos(el+\pi/4) + \Delta_{el}\cdot\cos az \\ \sin(el+\pi/4)(-\Delta_{azy}\cdot\cos az + \Delta_{azx}\cdot\sin az) \end{bmatrix}$$

A decision is then made in a sixth step 2660 to use the computed mirror optical axis error for feedback control or image correction. In preferred embodiments, this decision is actually made prior to the commissioning of the system 10.

In the case that the error is used to adjust the mirror control mechanism, as a next step 2670 the Jacobean Matrix J is first computed:

$$J(ax,el) = [\hat{z}\times MOA, (R_{\hat{x}}(az)\hat{y})\times MOA].$$

Then, as a final step 2680 corrections are computed as follows:

$$\begin{pmatrix} \Delta az \\ \Delta el \end{pmatrix} = -(J^TJ)^{-1}J^T \text{ MOA\_ERROR}.$$

In a preferred embodiment, the calculation of the mirror optical axis error in the fifth step 2650 is used for image correction, and is applied in an image correction algorithm, as an alternative step 2690 to implementing feedback control.

In this embodiment, a composite image is generally assembled as a two dimensional array of images taken by the telescope 16. Compensation data is used to ensure the correct placement of each image in the two dimensional array, and to ensure that each image is properly rotated, or "flat" in the two dimensional array. An example is depicted in FIG. 27, wherein a single image 2700 collected by the telescope 16 is placed appropriately in an array of data 2710 to form a composite image.

Figure 27:
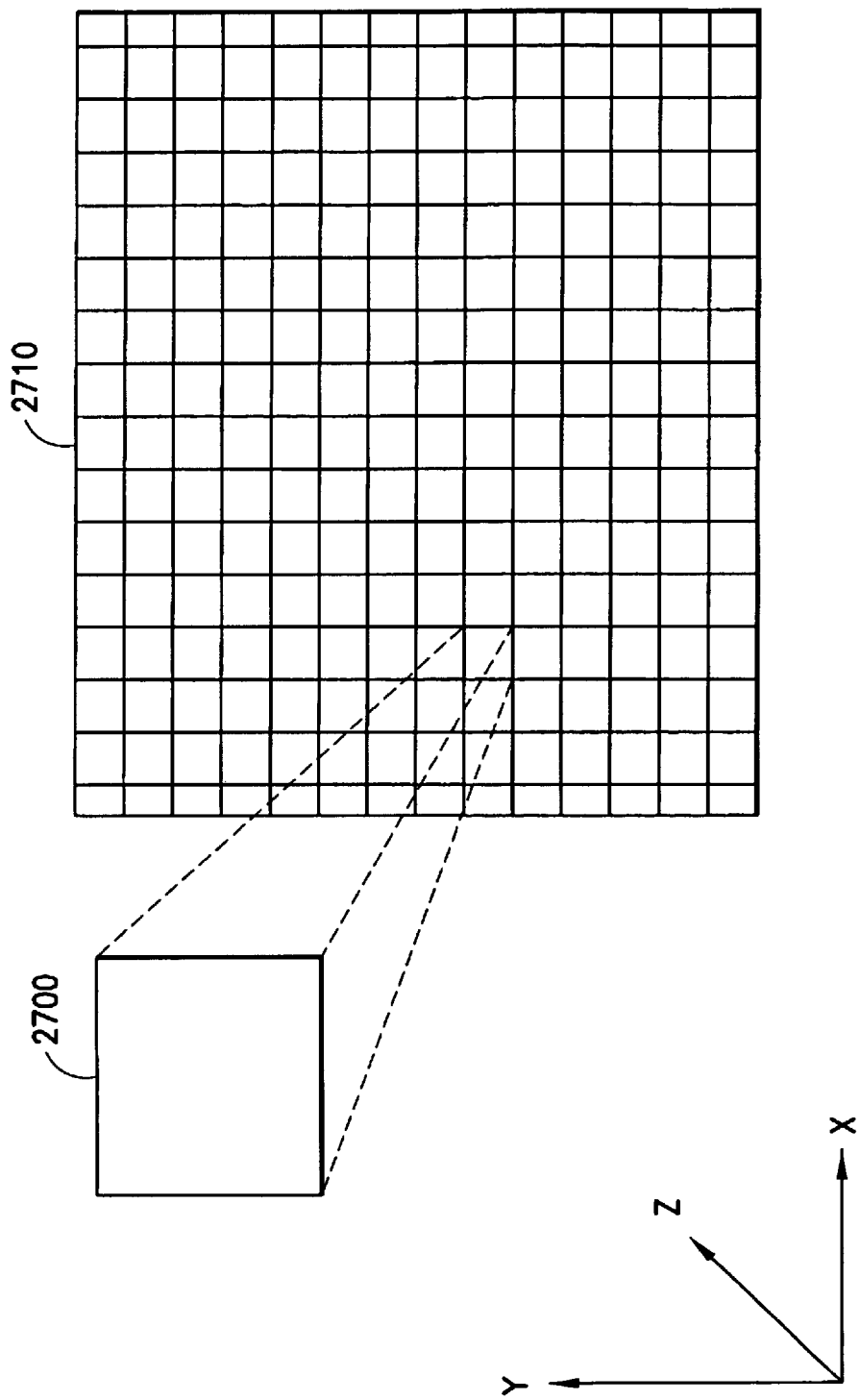
FIG. 27 is useful in explaining the use of image correction data for placement of an image into a composite image.

In FIG. 27, the image 2700 is adjusted in an X and Y direction. Using the data produced by the teachings herein, portions of the image 2700 may also be moved in the Z direction, to compensate for any skew in the image 2700. Although depicted as image data 2700 used to form a composite image 2710, it should be recognized, as stated elsewhere herein, that the data from the pointing device 11 may be in other forms. Therefore, one will also recognize that the example of FIG. 27 is not limiting of the use of the teachings herein for error compensation.

Figure 28:
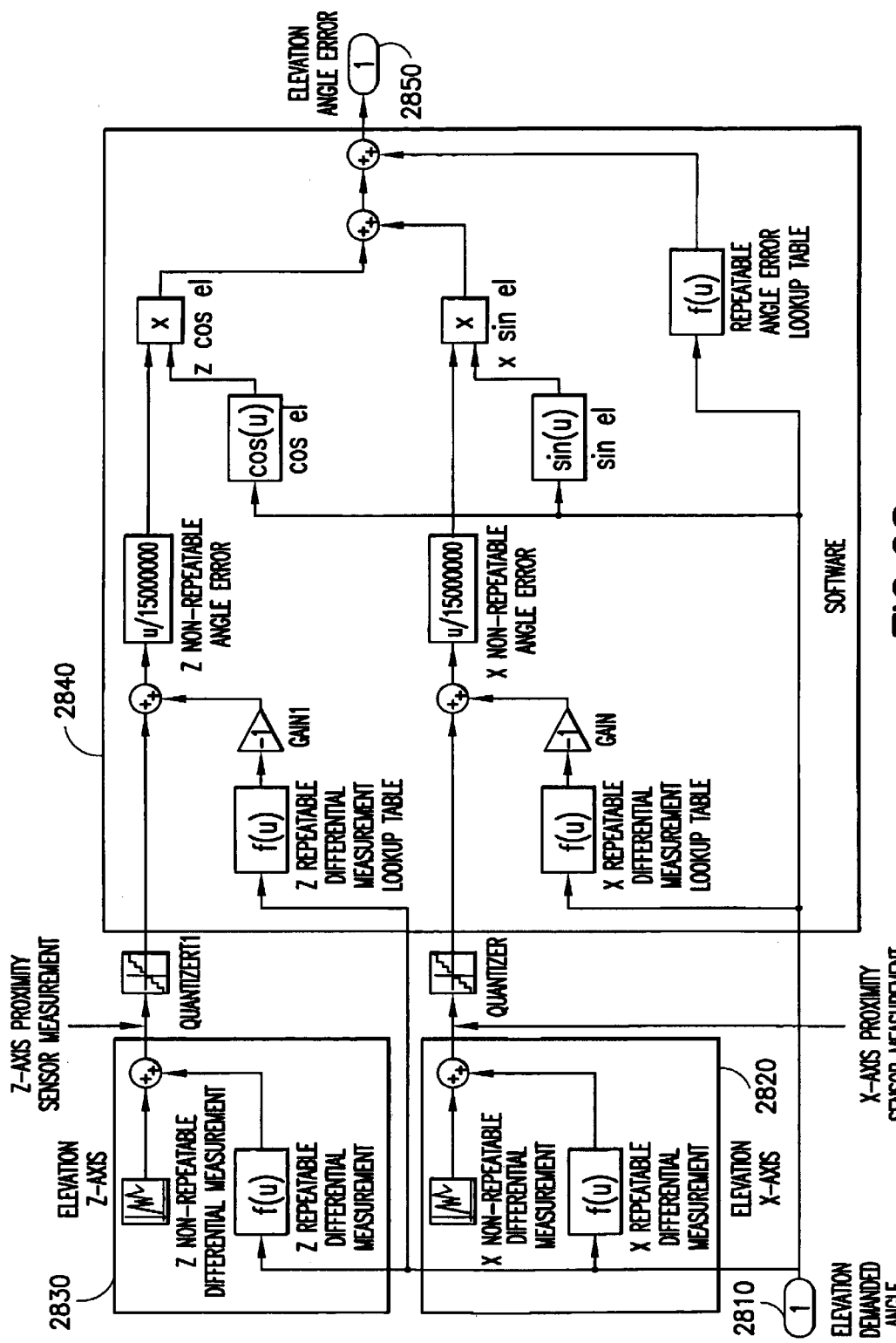
FIG. 28 is a block diagram of a system model for obtaining elevation angle error based on a relationship between the elevation angle and the demanded elevation angle.
Figure 29:
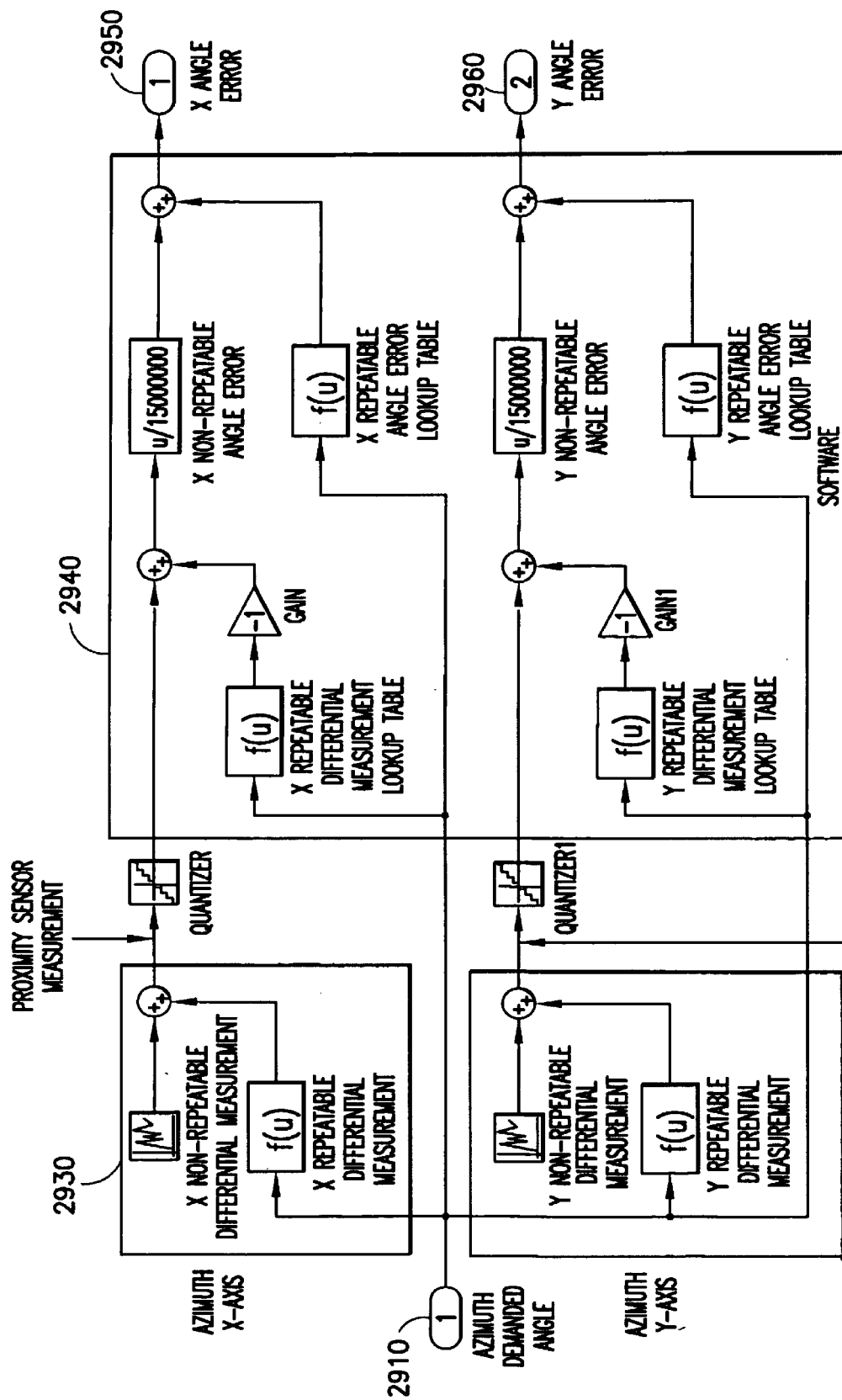
FIG. 29 is a block diagram of a system model for obtaining azimuth angle error based on a relationship between the azimuth angle and the demanded azimuth angle; and, FIG. 30 is a system block diagram that illustrates the derivation of mirror optical axis errors for three axes used to measure error in a pointing device.
Figure 30:
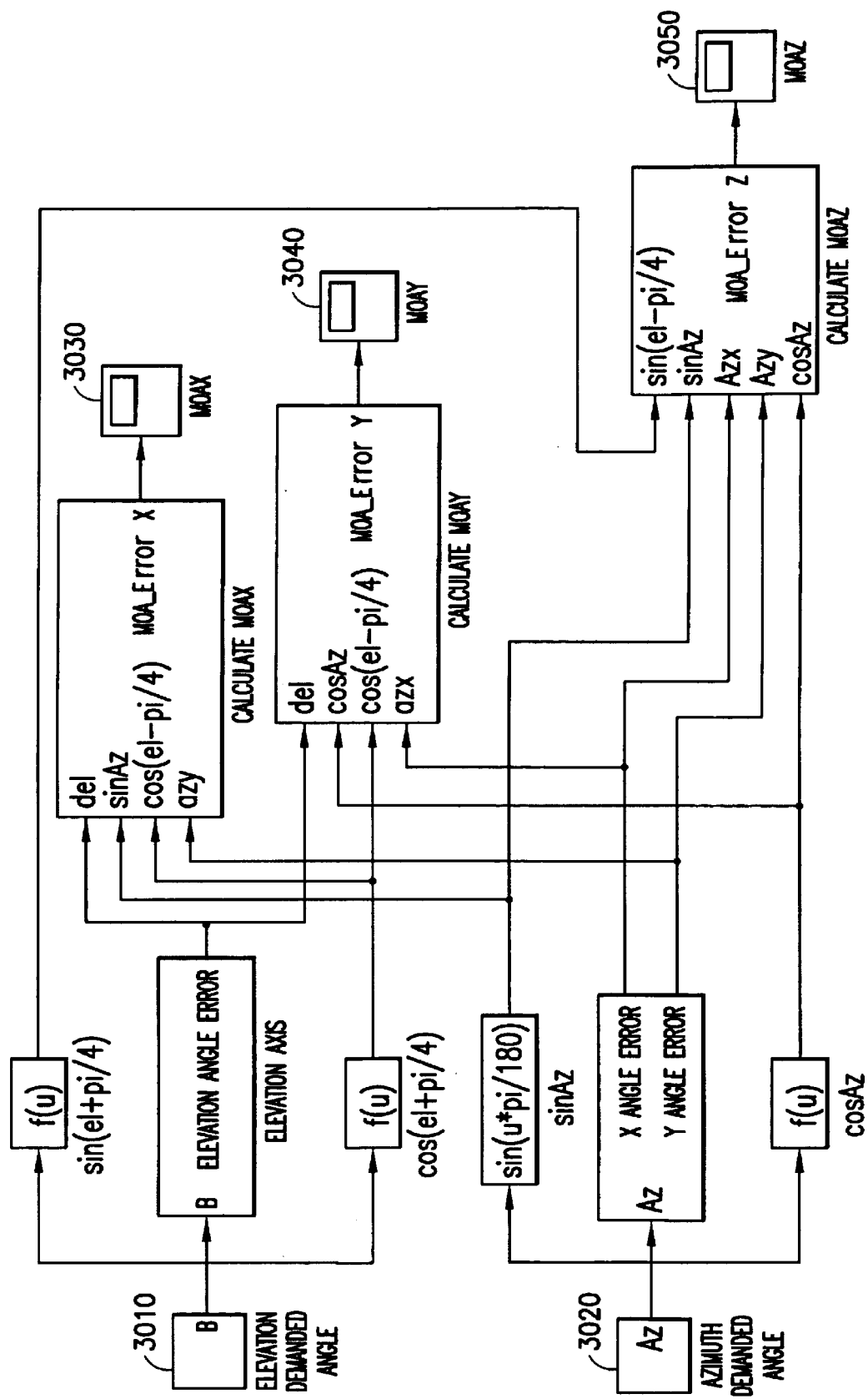

FIGS. 28–30 depict aspects of a model for simulation of the system disclosed herein. It is considered that the model described in FIGS. 28–30 depicts some of the fundamental aspects of the teachings herein, and that more detailed models may be realized.

Demanded Azimuth and Elevation Angles. In the model, it is assumed that the azimuth angle ranges from −10 to +10 degrees in steps of 1 degree, and then returns to −10 instantaneously. For each value of the azimuth angle, the elevation angle goes from −10 to +10 in steps of 1 degree, and then also returns instantaneously.

Response of Gimbal to Demanded Angles: Elevation Axis. FIG. 28 shows aspects of the model and the relationship between the elevation angle error and the demanded elevation angle. Adjustments in the elevation axis are computed for the X-axis in block 2820 and for the Z-axis in block 2830 in response to the demanded elevation angle, input in block 2810. The differential measurements include a repeatable component, as well as a non-repeatable component. The repeatable component is based on information obtained from calibration and stored in a look-up table. The information is maintained as necessary by software 2840. For modeling purposes, this component is expressed as a sine wave. The non-repeatable component is generally represented by a random source. In the model, for any demanded angle, the repeatable value is the same, but the random value generally varies. Once the error is computed, results are produced for use, shown as block 2850.

In the model, the proximity sensor output is quantized to represent the analog to digital converter. The output is then passed for conversion to elevation angle error. The repeatable differential measurement for the angle is subtracted from the digitized measurement, converted into radians, and then the repeatable error angle added.

Response of Gimbal to Demanded Angles: Azimuth Axis. This portion of the model uses the same principals as the elevation axis, however, this portion accounts for use of two differential proximity sensors 1000. This portion of the model is shown in FIG. 29. In FIG. 29, a demanded angle input 2910 is used for computing an adjustment in the azimuth Y-axis in block 2920, and an adjustment in the azimuth X-axis in block 2930. Software 2940 implements various functions to produce an X angle error 2950, and a Y angle error 2960.

FIG. 30 shows an overview of the model. In FIG. 30, an input for a demanded elevation angle 3010, and an input for a demanded elevation angle 3020 are used to compute the mirror optical axis error (MOA_ERROR). Results are produced representing the MOA_ERROR in the X-axis 3030, the MOA_ERROR in the Y-axis 3040, and the the MOA_ERROR in the Z-axis 3050.

Output produced by the model has shown that the MOA_ERROR y value 3040 is, on average, larger than the x 3030 and z 3050 error values. This is because $$\sin\left(el-\frac{\pi}{4}\right) \text{ and } \cos\left(el-\frac{\pi}{4}\right)$$

are approximately the same magnitude, while sin az is small and cos az is approximately 1.

Therefore, described herein are apparatus and methods for compensating for bearing errors in an active device included in a space-based apparatus, such as a satellite. The teachings herein are not limited to improving the operation of the active device described herein, and may be useful in other applications, such as ground based applications. It is also considered that the teachings herein are only illustrative of the apparatus and methods for compensating for bearing error. That is, it is considered that other measurement devices and algorithms could be used. Further, it is considered that while the teachings herein are directed to a certain basic design of a pointing device, these teachings are applicable to other designs as well.

What is claimed is:

1. A method for determining a pointing error of an object attached to a shaft, comprising:
   providing a set of distance measuring probes at each end of the shaft;
   using the probes, measuring a position of each end of the shaft for producing shaft-end position data;
   determining a geometric error vector for each end of the shaft from the shaft-end position data; and,
   using the geometric error vector, determining the pointing error of the object.

2. The method as in claim 1, wherein determining the geometric error vector comprises:
   referring to a source of characterization data comprising repeatable error data to obtain a repeatable error component corresponding to a location of the shaft; and,
   subtracting the repeatable error component from the position data to produce a non-repeatable error component.

3. The method as in claim 2, further comprising calculating angular error, $\Delta_{az}$, $\Delta_{el}$, from the non-repeatable error component.

4. The method as in claim 3, further comprising calculating the pointing error, MOA_ERROR, from the angular error, $\Delta_{az}$, $\Delta_{el}$.

5. The method as in claim 1, wherein providing the set of distance measuring probes comprises providing a first probe of the set to be disposed at an angle of about 90 degrees to a second probe of the set.

6. The method as in claim 1, wherein the geometric error vector indicates an angular position and a magnitude of an error producing feature of the shaft.

7. An apparatus for determining a pointing error of an object attached to a shaft, comprising:
   a set of distance measuring probes disposed at each end of the shaft adapted for monitoring a position of the shaft and producing shaft-end position data, the set of distance measuring probes being coupled to a processor for receiving the shaft-end position data and determining a geometric error vector for each end of the shaft and using the geometric error vector, determining the pointing error of the object.

8. The apparatus as in claim 7, wherein the shaft is disposed aboard a spacecraft, and where the object comprises a mirror.

9. The apparatus as in claim 7, wherein the object comprises at least one of a telescope, a mirror, a laser, a laser transceiver, and an angular measurement device.

10. The apparatus as in claim 7, wherein the set of distance measuring probes comprises a set of eddy current proximity sensors.

11. The apparatus as in claim 10, wherein the set of eddy current proximity sensors comprises dual channel eddy current proximity sensors.

12. The apparatus as in claim 7, comprising a first bearing assembly coupled to respective ends of the shaft.

13. The apparatus as in claim 12, comprising a gimbal coupled to the first bearing assembly.

14. The apparatus as in claim 13, comprising a second bearing assembly coupled to the gimbal.

15. The apparatus as in claim 14, wherein the set of distance measuring probes is adapted for monitoring at least one of the gimbal and a position of at least one of an inner ring and an outer ring of a respective bearing assembly.

16. The apparatus as in claim 7, comprising at least one flange for monitoring by the set of distance measuring probes.

17. The apparatus as in claim 16, wherein the at least one flange comprises one of passivated steel, aluminum and titanium.

18. The apparatus as in claim 7, wherein the apparatus is adapted for shielding the set of distance measuring probes from thermal effects.

19. A method for characterizing a repeatable position error in a pointing device attached to a shaft supported by bearings, comprising:
   providing a set of distance measuring probes at each end of the shaft;
   setting the shaft to a predetermined location;
   measuring a position of each end of the shaft at the predetermined location for producing position data;
   determining a geometric error vector from the position data for each end of the shaft;
   using the geometric error vector, determining a pointing error of the pointing device;
   storing the pointing error for each predetermined location to establish a pointing error record;
   repeating the determining of the pointing error until a new determination of pointing error for a predetermined location is within an acceptable tolerance for agreement with the pointing error record; and,
   identifying the pointing error stored in the pointing error record as repeatable position error data.

20. The method as in claim 19, wherein the measuring is performed at a predetermined temperature.

21. The method as in claim 19, wherein the pointing device is disposed aboard a spacecraft.

22. A computer program product stored on a computer readable storage medium, comprising computer readable program code instructions to determine a pointing error of an object, the instructions comprising steps for:
   producing measurement data for a location of the object by measuring a position of a shaft with a set of distance measuring sensors disposed at each end of the shaft to which the object is attached;
   determining a geometric error vector for each end of the shaft from the position data; and,
   using the geometric error vector, determining the pointing error of the object.

23. The computer program product as in claim 22, further comprising instructions for communicating at least one of the measurement data and the pointing error to a remote station.

24. A method for determining pointing error of a pointing device, the method comprising:
   providing the pointing device attached to a shaft, the shaft coupled to a first bearing assembly rotating about a first axis, and coupled to a second bearing assembly rotating about a second axis, and a set of distance measuring sensors adapted to monitor the position of the pointing device;
   measuring the position of the pointing device along the first axis and the second axis to produce position data, ds;
   retrieving repeatable error data from a source of calibration data to produce a repeatable error component;

subtracting the repeatable error component from the position data, ds, to produce a non-repeatable error component, ads;

using the non-repeatable error component, ads, computing a first axis position error, $\Delta_{az}$, and computing a second axis position error, $\Delta_{el}$; and, computing the pointing device error, MOA_ERROR, as $$\text{MOA\_ERROR} = \begin{bmatrix} \Delta_{azy} \cdot \cos(el + \pi/4) - \Delta_{el} \cdot \sin az \\ -\Delta_{azx} \cdot \cos(el + \pi/4) + \Delta_{el} \cdot \cos az \\ \sin(el + \pi/4)(-\Delta_{azy} \cdot \cos az + \Delta_{azx} \cdot \sin az) \end{bmatrix};$$

where $\Delta_{azy}$ denotes a y-axis component of the first axis position error, $\Delta_{az}$; $\Delta_{azx}$ denotes a x-axis component of the first axis position error, $\Delta_{az}$; el denotes an angle in the second axis, and az denotes an angle in the first axis.

25. A method for compensating for pointing error in a pointing device attached to a shaft of a spacecraft, comprising:

providing a set of distance measuring probes at each end of the shaft;

measuring a position of each end of the shaft for producing position data;

determining a geometric error vector for each end of the shaft from the position data;

using the geometric error vector, determining the pointing error of the pointing device;

using the pointing error to adjust one of a position of the pointing device and a set of data produced by the pointing device.

\* \* \* \* \*